US012219445B2

(12) United States Patent
Li et al.

(10) Patent No.: US 12,219,445 B2
(45) Date of Patent: Feb. 4, 2025

(54) VEHICLE ON-BOARD UNIT FOR CONNECTED AND AUTOMATED VEHICLE SYSTEMS

(71) Applicant: CAVH LLC, Fitchburg, WI (US)

(72) Inventors: Shen Li, Madison, WI (US); Bin Ran, Fitchburg, WI (US); Zhen Zhang, Madison, WI (US); Yang Cheng, Middleton, WI (US); Huachun Tan, Madison, WI (US); Tianyi Chen, Madison, WI (US); Shuoxuan Dong, Madison, WI (US); Kunsong Shi, Madison, WI (US); Linhui Ye, Madison, WI (US); Qin Li, Madison, WI (US); Zhijun Chen, Fitchburg, WI (US); Linchao Li, Madison, WI (US); Linghui Xu, Madison, WI (US); Xia Wan, Fitchburg, WI (US); Xiaoxuan Chen, Fitchburg, WI (US)

(73) Assignee: CAVH LLC, Fitchburg, WI (US)

(*) Notice: Subject to any disclaimer, the term of this patent is extended or adjusted under 35 U.S.C. 154(b) by 373 days.

(21) Appl. No.: 16/505,034

(22) Filed: Jul. 8, 2019

(65) Prior Publication Data

US 2020/0021961 A1    Jan. 16, 2020

Related U.S. Application Data

(60) Provisional application No. 62/695,964, filed on Jul. 10, 2018.

(51) Int. Cl.
    *H04W 4/44*     (2018.01)
    *G05D 1/00*     (2024.01)
    (Continued)

(52) U.S. Cl.
    CPC ............ *H04W 4/44* (2018.02); *G05D 1/0022* (2013.01); *G05D 1/0291* (2013.01);
    (Continued)

(58) Field of Classification Search
    CPC ........... H04W 4/44; H04W 4/46; H04W 4/80; G05D 1/0022; G05D 1/0291; G08G 1/0116
    See application file for complete search history.

(56) References Cited

U.S. PATENT DOCUMENTS 3,824,469 A    7/1974   Ristenbatt
4,023,017 A    5/1977   Ceseri
(Continued)

FOREIGN PATENT DOCUMENTS

CN    102768768 B    11/2012
CN    103854473 A    6/2014
(Continued)

OTHER PUBLICATIONS

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.
(Continued)

*Primary Examiner* — Aniss Chad
*Assistant Examiner* — Stephanie T Su
(74) *Attorney, Agent, or Firm* — Casimir Jones, S.C.; Thomas A. Isenbarger

(57) ABSTRACT

This technology provides designs and methods for the vehicle on-board unit (OBU), which facilitates vehicle operations and control for connected automated vehicle highway (CAVH) systems. OBU systems provide vehicles with individually customized information and real-time con-
(Continued)

trol instructions for vehicle to fulfill the driving tasks such as car following, lane changing, route guidance. OBU systems also realize transportation operations and management services for both freeways and urban arterials. The OBU composed of the following devices: 1) a vehicle motion state parameter and environment parameter collection unit; 2) a multi-mode communication unit; 3) a location unit; 4) an intelligent gateway unit, and 5) a vehicle motion control unit. The OBU systems realize one or more of the following function categories: sensing, transportation behavior prediction and management, planning and decision making, and vehicle control. OBU is supported by real-time wired and/or wireless communication, the power supply networks, the cloud, cyber safety, security services, and the human machine interface.

21 Claims, 14 Drawing Sheets

(51) Int. Cl.
   *G08G 1/01* (2006.01)
   *H04W 4/46* (2018.01)
   *H04W 4/80* (2018.01)
(52) U.S. Cl.
   CPC ............ *G08G 1/0116* (2013.01); *H04W 4/46* (2018.02); *H04W 4/80* (2018.02)

(56) References Cited

U.S. PATENT DOCUMENTS

| | | | |
|---|---|---|---|
| 4,704,610 A | 11/1987 | Smith et al. | |
| 4,962,457 A | 10/1990 | Chen et al. | |
| 5,295,551 A * | 3/1994 | Sukonick | B62D 1/28 |
| | | | 180/167 |
| 5,420,794 A | 5/1995 | James | |
| 5,504,683 A | 4/1996 | Gurmu | |
| 5,625,559 A | 4/1997 | Egawa | |
| 5,732,785 A | 3/1998 | Ran et al. | |
| 6,028,537 A | 2/2000 | Suman et al. | |
| 6,064,318 A | 5/2000 | Kirchner, III et al. | |
| 6,317,682 B1 | 11/2001 | Ogura et al. | |
| 6,829,531 B2 | 12/2004 | Lee | |
| 6,900,740 B2 | 5/2005 | Bloomquist et al. | |
| 7,295,904 B2 | 11/2007 | Kanevsky et al. | |
| 7,324,893 B2 | 1/2008 | Yamashita et al. | |
| 7,343,243 B2 | 3/2008 | Smith | |
| 7,382,274 B1 | 6/2008 | Kermani et al. | |
| 7,418,346 B2 | 6/2008 | Breed et al. | |
| 7,421,334 B2 | 9/2008 | Dahlgren et al. | |
| 7,425,903 B2 | 9/2008 | Boss et al. | |
| 7,554,435 B2 | 6/2009 | Tengler et al. | |
| 7,725,249 B2 | 5/2010 | Kickbusch | |
| 7,860,639 B2 | 12/2010 | Yang | |
| 7,894,951 B2 | 2/2011 | Norris et al. | |
| 7,979,172 B2 | 7/2011 | Breed | |
| 8,352,112 B2 | 1/2013 | Mudalige | |
| 8,527,139 B1 | 9/2013 | Yousuf | |
| 8,589,070 B2 | 11/2013 | Ban | |
| 8,630,795 B2 | 1/2014 | Breed et al. | |
| 8,682,511 B2 | 3/2014 | Andreasson | |
| 8,972,080 B2 | 3/2015 | Shida et al. | |
| 9,053,636 B2 | 6/2015 | Gordon | |
| 9,076,332 B2 | 7/2015 | Myr | |
| 9,120,485 B1 | 9/2015 | Dolgov | |
| 9,182,951 B1 | 11/2015 | Ormerod et al. | |
| 9,349,055 B1 | 5/2016 | Ogale | |
| 9,494,935 B2 | 11/2016 | Okumura et al. | |
| 9,495,874 B1 | 11/2016 | Zhu et al. | |
| 9,595,190 B2 | 3/2017 | McCrary | |
| 9,646,496 B1 | 5/2017 | Miller et al. | |
| 9,654,511 B1 | 5/2017 | Brocco et al. | |
| 9,665,101 B1 | 5/2017 | Templeton | |
| 9,731,713 B2 | 8/2017 | Horii | |
| 9,799,224 B2 | 10/2017 | Okamoto | |
| 9,845,096 B2 | 12/2017 | Urano et al. | |
| 9,940,840 B1 | 4/2018 | Schubert et al. | |
| 9,964,948 B2 | 5/2018 | Ullrich et al. | |
| 10,074,223 B2 | 9/2018 | Newman | |
| 10,074,273 B2 | 9/2018 | Yokoyama et al. | |
| 10,380,886 B2 | 8/2019 | Ran et al. | |
| 2002/0008637 A1 | 1/2002 | Lemelson et al. | |
| 2003/0045995 A1 | 3/2003 | Lee | |
| 2004/0145496 A1 | 7/2004 | Ellis | |
| 2004/0230393 A1 | 11/2004 | Tzamaloukas | |
| 2005/0060069 A1 | 3/2005 | Breed et al. | |
| 2005/0102098 A1 | 5/2005 | Montealegre et al. | |
| 2005/0209769 A1 | 9/2005 | Yamashita et al. | |
| 2005/0222760 A1 | 10/2005 | Cabral et al. | |
| 2006/0142933 A1 | 6/2006 | Feng | |
| 2006/0226968 A1 | 10/2006 | Tengler et al. | |
| 2006/0251498 A1 | 11/2006 | Buzzoni et al. | |
| 2007/0093997 A1 | 4/2007 | Yang et al. | |
| 2007/0146162 A1 | 6/2007 | Tengler et al. | |
| 2008/0042815 A1 | 2/2008 | Breed et al. | |
| 2008/0095163 A1 | 4/2008 | Chen et al. | |
| 2008/0150786 A1 | 6/2008 | Breed | |
| 2008/0161986 A1 | 7/2008 | Breed et al. | |
| 2008/0161987 A1 | 7/2008 | Breed | |
| 2008/0275646 A1 | 11/2008 | Perng et al. | |
| 2010/0013629 A1 | 1/2010 | Sznaider et al. | |
| 2010/0256836 A1 | 10/2010 | Mudalige et al. | |
| 2011/0224892 A1 | 9/2011 | Speiser | |
| 2011/0227757 A1 | 9/2011 | Chen et al. | |
| 2012/0017262 A1 | 1/2012 | Kapoor et al. | |
| 2012/0022776 A1 | 1/2012 | Razavilar et al. | |
| 2012/0059574 A1 | 3/2012 | Hada | |
| 2012/0105639 A1 | 5/2012 | Stein et al. | |
| 2012/0143786 A1 | 6/2012 | Karner | |
| 2012/0283910 A1 | 11/2012 | Lee et al. | |
| 2012/0303807 A1 | 11/2012 | Akelbein et al. | |
| 2013/0116915 A1 | 5/2013 | Ferreira et al. | |
| 2013/0137457 A1 | 5/2013 | Potkonjak | |
| 2013/0138714 A1 | 5/2013 | Ricci | |
| 2013/0141580 A1 | 6/2013 | Stein et al. | |
| 2013/0204484 A1 | 8/2013 | Ricci | |
| 2013/0218412 A1 | 8/2013 | Ricci | |
| 2013/0297140 A1 | 11/2013 | Montemerlo et al. | |
| 2013/0297196 A1 | 11/2013 | Shida | |
| 2014/0112410 A1 | 4/2014 | Yokoyama | |
| 2014/0219505 A1 | 8/2014 | Kindo et al. | |
| 2014/0222322 A1 | 8/2014 | Durekovic | |
| 2014/0278026 A1 | 9/2014 | Taylor | |
| 2014/0278052 A1 | 9/2014 | Slavin et al. | |
| 2014/0354451 A1 | 12/2014 | Tonguz et al. | |
| 2015/0153013 A1 | 6/2015 | Zhao et al. | |
| 2015/0166072 A1* | 6/2015 | Powers | B60W 40/076 |
| | | | 701/1 |
| 2015/0169018 A1 | 6/2015 | Rogo et al. | |
| 2015/0197247 A1 | 7/2015 | Ichinowaka | |
| 2015/0199685 A1 | 7/2015 | Betancourt et al. | |
| 2015/0211868 A1 | 7/2015 | Matsushita et al. | |
| 2015/0310742 A1 | 10/2015 | Albornoz | |
| 2016/0042303 A1 | 2/2016 | Medina et al. | |
| 2016/0086391 A1 | 3/2016 | Ricci | |
| 2016/0110820 A1 | 4/2016 | Fleck et al. | |
| 2016/0132705 A1 | 5/2016 | Kovarik et al. | |
| 2016/0142492 A1 | 5/2016 | Fang et al. | |
| 2016/0148440 A1 | 5/2016 | Kwak | |
| 2016/0216130 A1 | 7/2016 | Abramson et al. | |
| 2016/0221186 A1 | 8/2016 | Perrone | |
| 2016/0231746 A1 | 8/2016 | Hazelton et al. | |
| 2016/0238703 A1 | 8/2016 | Liu et al. | |
| 2016/0325753 A1 | 11/2016 | Stein et al. | |
| 2016/0328272 A1 | 11/2016 | Ahmed et al. | |
| 2016/0330036 A1 | 11/2016 | Zhou et al. | |
| 2016/0370194 A1 | 12/2016 | Colijn et al. | |
| 2017/0026893 A1 | 1/2017 | Lagassey | |
| 2017/0039435 A1 | 2/2017 | Ogale et al. | |
| 2017/0046883 A1 | 2/2017 | Gordon et al. | |
| 2017/0053529 A1 | 2/2017 | Yokoyama et al. | |

(56) References Cited

U.S. PATENT DOCUMENTS

| | | | |
|---|---|---|---|
| 2017/0075195 | A1 | 3/2017 | Stein et al. |
| 2017/0085632 | A1 | 3/2017 | Cardote |
| 2017/0090994 | A1 | 3/2017 | Jubinski et al. |
| 2017/0109644 | A1 | 4/2017 | Nariyambut Murali et al. |
| 2017/0131435 | A1 | 5/2017 | Peacock et al. |
| 2017/0132916 | A1* | 5/2017 | Ioli .................. G08G 1/005 |
| 2017/0206783 | A1 | 7/2017 | Miller |
| 2017/0262790 | A1 | 9/2017 | Khasis |
| 2017/0276492 | A1 | 9/2017 | Ramasamy |
| 2017/0324817 | A1 | 11/2017 | Oliveir et al. |
| 2017/0337571 | A1 | 11/2017 | Bansal et al. |
| 2017/0339224 | A1 | 11/2017 | Condeixa et al. |
| 2017/0357980 | A1 | 12/2017 | Bakun et al. |
| 2018/0018216 | A1 | 1/2018 | Halford et al. |
| 2018/0018888 | A1* | 1/2018 | Townsend .............. B60W 10/18 |
| 2018/0053413 | A1 | 2/2018 | Patil et al. |
| 2018/0065637 | A1 | 3/2018 | Bassindale |
| 2018/0114079 | A1 | 4/2018 | Myers et al. |
| 2018/0151064 | A1 | 5/2018 | Xu et al. |
| 2018/0158327 | A1 | 6/2018 | Gärtner |
| 2018/0190116 | A1 | 7/2018 | Bauer et al. |
| 2018/0262887 | A1 | 9/2018 | Futaki |
| 2018/0299274 | A1 | 10/2018 | Moghe et al. |
| 2018/0308344 | A1 | 10/2018 | Ravindranath et al. |
| 2018/0336780 | A1 | 11/2018 | Ran et al. |
| 2018/0364725 | A1* | 12/2018 | Lonari ................. B60W 30/188 |
| 2019/0096238 | A1 | 3/2019 | Ran et al. |
| 2019/0244518 | A1 | 8/2019 | Yang et al. |
| 2019/0244521 | A1 | 8/2019 | Ran et al. |

FOREIGN PATENT DOCUMENTS

| | | |
|---|---|---|
| CN | 104485003 B | 4/2015 |
| CN | 106710203 A | 5/2017 |
| CN | 107665578 A | 2/2018 |
| CN | 107807633 A | 3/2018 |
| CN | 108039053 A | 5/2018 |
| CN | 108447291 A | 8/2018 |
| EP | 2395472 A1 | 12/2011 |
| KR | 20170008703 A | 1/2017 |
| WO | WO 2015/114592 A1 | 8/2015 |
| WO | WO 2016/077027 A1 | 5/2016 |
| WO | WO 2016/135561 A1 | 9/2016 |
| WO | WO 2017/049978 A1 | 3/2017 |
| WO | WO 2017/079474 A2 | 5/2017 |
| WO | WO 2017/115342 A1 | 7/2017 |
| WO | WO 2017/160276 A1 | 9/2017 |
| WO | WO 2018/039134 A1 | 3/2018 |
| WO | WO 2018/132378 | 7/2018 |
| WO | WO 2019/156955 A1 | 8/2019 |
| WO | WO 2019/156956 A1 | 8/2019 |

OTHER PUBLICATIONS

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

Bhat "Travel Modeling in an Era of Connected and Automated Transportation Systems: An Investigation in the Dallas-Fort Worth Area," Techinal Report 122, Center for Transportation Research, Feb. 2017 [retrieved on Sep. 3, 2019]. Retrieved from the Internet: <URL:http://www.caee.utexas.edu/prof/bhat/REPORTS/DSTOP_122.pdf> pp. 1-61.

Conduent™—Toll Collection Solutions, https://www.conduent.com/solution/transportation-solutions/electronic-toll-collection/, retrived on: Nov. 3, 2017, 3 pages.

Doshi Review of the book "Security for Cloud Storage Systems" MEFHI, Gauridad Campus, India, 2014, pp. 1-2 [retrieved on Sep. 5, 2019]. Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity," FP Think: Effects of Next-Generation Vehicles on Travel Demand and Highway Capacity Feb. 2014, [retrieved on Jun. 13, 2019]. Retrived from the Internet: <URL:http://www.fehrandpeers.com/wp-content/uploads/2015/07/FP_Thing_Next_Gen_White_Paper_FINAL.pdf> pp. 1-39.

Flammini et al. "Wireless sensor networking in the internet of things and cloud computing era." Procedia Engineering 87 (2014): 672-679.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Johri et al., "A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

Maaß et al., "Data Processing of High-rate low-voltage Distribution Grid Recordings for Smart Grid Monitoring and Analysis," EURASIP Journal on Advances in Signal Processing (2015) 2015:14 DOI 10.1186/s13634-015-02034[retrieved on Sep. 3, 2019]. Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with High Trip Generator Employers." MiamiDadeTPO.org. pp. 1-99 Jan. 31, 2018, [retrieved on Jun. 13, 2019]. Retrieved from the Internet:<URL:http://www.miamidadetpo.org/library/studies/first-mile-last-mile-options-with-high-trip-generator-employers-2017-12.pdf>.

MK5 V2X ,Cohda Wireless,http://cohdawireless.com, retrieved on: Nov. 3, 2017, 2 pages.

National Association of City Transportation Officials. "Blueprint for Autonomous Urbanism". New York, NY10017, www.nacto.org, Fall 2017, [retrieved on Sep. 5, 2019]. Retrieved from the Internet: <URL:https://nacto.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019]. Retrieved from the Internet: <URL:https://www.oregon.gov/ODOT/KOM/VP-TM2-InitialConcepts.PDF>.

Products for Toll Collection—Mobility—Siemens—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.

Society of Automotive Engineers International's new standard J3016: "Taxonomy and Definitions for Terms Related to On-Road Motor Vehicle Automated Driving Systems" 2014, downloaded Sep. 17, 2019, 12 pages.

Southwest Research Institute, Basic Infrastructure Message Development and Standards Support for Connected Vehicles Applications, Apr. 24, 2018. {retrieved on Sep. 3, 2019}. Retrieved from the Internet: <URL:http://www.cts.virginia.edu/wp-content/uploads/2018/12/Task4-Basic-Infrastructure-Message-Development-20180425-Final.pdf> pp. 1-76.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

(56) References Cited

OTHER PUBLICATIONS

Surakitbanharn "Connected and Autonomous Vehicles: A Policy Review" Purdue Policy Research Institute, Feb. 2018, retrieved on Sep. 3, 2019, retrieved from the interned: <URL:https://www.purdue.edu/discoverypark/ppri/docs/CATV%20Policy%20Writeup%20Feb%202018.pdf> pp. 1-17.

TDC-GPX2 LIDAR of precision-measurement-technologies, http://pmt-fl.com, retrieved on: Nov. 3, 2017, 2 pages.

Teletrac Navman http://drive.teletracnavman.com/, retrieved on: Nov. 3, 2017, 2 pages.

Vector CANalyzer9.0 from vector https://vector.com, retrieved on Nov. 3, 2017, 1 page.

Williams "Transportation Planning Implications of Automated/Connected Vehicles on Texas Highways" Texas A&M Transportation Institute, Apr. 2017, 34 pages.

International Search Report of related PCT/US2018/012961, mailed May 10, 2018, 16 pages.

International Search Report of related PCT/US2019/016606, mailed Apr. 23, 2019, 21 pages.

International Search Report of related PCT/US2019/016603, mailed Apr. 24, 2019, 17 pages.

International Search Report of related PCT/US2019/031304, mailed Aug. 9, 2019, 17 pages.

International Search Report of related PCT/US2019/026569, mailed Jul. 8, 33 pages.

International Search Report of related PCT/US2019/037963, mailed Sep. 10, 2019, 54 pages.

International Search Report of related PCT/US2019/041004, mailed Oct. 3, 2019, 18 pages.

International Search Report of related PCT/US2019/040814, mailed Oct. 8, 2019, 20 pages.

International Search Report of related PCT/US2019/041008, mailed Oct. 8, 2019, 16 pages.

International Search Report of related PCT/US2019/040819, mailed Oct. 17, 2019, 41 pages.

International Search Report of related PCT/US2019/039376, mailed Oct. 29, 2019, 11 pages.

International Search Report of related PCT/US2019/040809, mailed Nov. 15, 2019, 17 pages.

\* cited by examiner

VEHICLE ON-BOARD UNIT FOR CONNECTED AND AUTOMATED VEHICLE SYSTEMS This application claims priority to U.S. provisional patent application Ser. No. 62/695,964, filed Jul. 10, 2018, which is incorporated herein by reference in its entirety.

FIELD

The present technology relates to a vehicle on-board unit (OBU) configured to provide transportation management and operations and vehicle control for connected and automated vehicles (CAV) in coordination with an intelligent road infrastructure system (IRIS), and, more particularly, to a system for controlling CAVs by sending customized, detailed, and time-sensitive control instructions and traffic information for automated vehicle driving to individual vehicles, such as vehicle following, lane changing, route guidance, and other related information.

BACKGROUND

Vehicles equipped with an on-board unit (OBU) that can sense their environment and navigate without human input, or with reduced human input, are in development. At present, these vehicles are in experimental testing and not in widespread commercial use. Existing approaches require expensive and complicated on-board systems, making widespread implementation a substantial challenge.

For instance, a technology described in U.S. Pat. No. 7,421,334 provides an on-board intelligent vehicle system comprising a sensor assembly to collect data and a processor to process the data to determine the occurrence of at least one event. An additional technology described in U.S. Pat. No. 7,554,435 describes a vehicle on-board unit that is configured to communicate with other vehicles to alert a driver of a potential braking situation in a preceding vehicle. However, the existing technology is limited because present OBU only communicate with other vehicles or infrastructures. Furthermore, these conventional technologies are designed to provide an autonomous driving vehicle system and do not provide a technology for a connected automated vehicle highway system.

SUMMARY

In some embodiments, the present technology provides a comprehensive system configured to provide full vehicle operations and control for connected and automated vehicle and highway systems by sending detailed and time-sensitive control instructions to individual vehicles. In some embodiments, the technology comprises a connected automated vehicle highway system and methods and/or components thereof as described in U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, the disclosures of which are herein incorporated by reference in their entireties (referred to herein as a CAVH system). In some embodiments, the technology relates to the use of a connected automated vehicle highway system and methods and/or components thereof for heavy and special vehicles, e.g., as described in U.S. Provisional Patent Application Ser. No. 62/687,435, filed Jun. 20, 2018, which is incorporated herein by reference.

Accordingly, in some embodiments, the technology provided herein relates to a vehicle control on-board unit (OBU) configured to exchange data with a vehicle infrastructure coordination transportation system. In some embodiments, the technology comprises an OBU configured to exchange data with a vehicle. In some embodiments, the vehicle control OBU is configured to control a vehicle (e.g., a vehicle comprising the OBU). In some embodiments, the OBU is configured to exchange data with components of a CAVH system. In some embodiments, the vehicle control OBU comprises sensing modules to collect and/or provide information describing the driving environment. In some embodiments, the vehicle control OBU comprises modules to provide data processing. In some embodiments, the vehicle control OBU comprises modules to provide communication. In some embodiments, the vehicle control OBU comprises modules to provide data backups. In some embodiments, the vehicle control OBU comprises modules to improve the automation level of the vehicle. In some embodiments, the vehicle control OBU comprises a vehicle motion state parameter collection unit. In some embodiments, the vehicle control OBU comprises a vehicle environment parameter collection unit. In some embodiments, the vehicle control OBU comprises a multi-mode communication unit. In some embodiments, the vehicle control OBU comprises a location unit. In some embodiments, the vehicle control OBU comprises an intelligent gateway unit. In some embodiments, the vehicle control OBU comprises a vehicle motion control unit.

In some embodiments, the vehicle control OBU is configured to provide a function selected from the group consisting of sensing; prediction; planning; decision making; and control. In some embodiments, the vehicle control OBU is configured to communicate in real-time using wired and/or wireless media. In some embodiments, the vehicle control OBU comprises a power supply and/or is configured to receive power from a power supply. In some embodiments, the vehicle control OBU is configured to communicate with the CAVH cloud, e.g., as described in U.S. Provisional Patent Application Ser. No. 62/691,391, incorporated herein by reference in its entirety. In some embodiments, the vehicle control OBU is configured to communicate with a safety subsystem. In some embodiments, the vehicle control OBU is configured to communicate with a cyber security subsystem. In some embodiments, the vehicle control OBU is configured to communicate with a human-machine interface.

In some embodiments, the vehicle control OBU is configured to receive an intelligence allocation. In some embodiments, the vehicle control OBU is configured to provide a range of intelligence levels. In some embodiments, the vehicle control OBU is configured to provide a weak intelligence level. In some embodiments, the vehicle control OBU receives data from a road side unit (RSU). In some embodiments, In some embodiments, the vehicle control OBU sends data to a vehicle as input to control the vehicle. In some embodiments, the vehicle control OBU is configured to function as an information transfer station. In some embodiments, the vehicle control OBU is configured to provide a strong intelligence level. In some embodiments, the vehicle control OBU is configured to sense the driving environment. In some embodiments, the vehicle control OBU is configured to receive data from another system, module, and/or component of the CAVH system. In some embodiments, the vehicle control OBU is configured to process driving environment data and/or data received from another system, module, and/or component of the CAVH system. In some embodiments, the vehicle control OBU the OBU is configured to send the data to a vehicle to control said vehicle. In some embodiments, the vehicle control OBU is configured to provide a super intelligence level. In some embodiments, the vehicle control OBU is configured to seek data actively and/or mobilize resources for data processing.

In some embodiments, the vehicle control OBU comprises a component configured for Infrastructure to Vehicle communication. In some embodiments, the component is a hardware component. In some embodiments, the component is configured to send information between a first vehicle and a second vehicle. In some embodiments, the component is configured to communicate using dedicated short range communications (DSRC), WiFi (e.g., IEEE 802.11), 4G, 5G, BLUETOOTH, and/or satellite communication. In some embodiments, the component is configured for Infrastructure to infrastructure communication. In some embodiments, the component is a hardware component. In some embodiments, the component is configured to send information from a vehicle to infrastructure. In some embodiments, the component is configured to communicate using dedicated short range communications (DSRC), WiFi (e.g., IEEE 802.11), 4G, 5G, BLUETOOTH, and/or high speed internet. In some embodiments, the infrastructure comprises an IRIS system. In some embodiments, the component communicates with an OBU to provide information collected by infrastructure. In some embodiments, the information is provided to an OBU for vehicle control. In some embodiments, the component is configured to communicate control commands to support an OBU. In some embodiments, the vehicle control OBU comprises a component configured for Vehicle to Vehicle communication. In some embodiments, the component is a hardware component. In some embodiments, the component is configured to send information from a first vehicle to a second vehicle. In some embodiments, the component is configured to communicate using dedicated short range communications (DSRC), WiFi (e.g., IEEE 802.11), 4G, 5G, and/or BLUETOOTH. In some embodiments, the vehicle control OBU comprises a component configured for Vehicle to infrastructure communication. In some embodiments, the component is a hardware component. In some embodiments, the component is configured to communicate between a vehicle and infrastructure. In some embodiments, the component is configured to using dedicated short range communications (DSRC), WiFi (e.g., IEEE 802.11), 4G, 5G, and/or BLUETOOTH. In some embodiments, the component is configured to send information collected from a vehicle to an RSU, the IRIS system, people in the nearby region, and/or other vehicles.

In some embodiments, the vehicle control OBU comprises one or more of a Microscopic level environment sensing device, Mesoscopic level roadside sensing device, In-vehicle sensing device, and/or Vehicle CAN bus interface module. In some embodiments, the Microscopic level environment sensing device comprises a camera set, long-range/short-range microwave radar, ultrasonic radar, and/or inertial measurement unit. In some embodiments, the Mesoscopic level roadside sensing device comprises a sensor on a RSU. In some embodiments, the Mesoscopic level roadside sensing device comprises a camera set, long-range/short-range microwave radars, and/or LIDAR. In some embodiments, the in-vehicle sensing devices comprise a camera or interface. In some embodiments, the vehicle control OBU is configured to perform a sensing method comprising Microscopic Level environment sensing and object detection. In some embodiments, the Microscopic Level environment sensing and object detection comprises detecting objects in the driving environment. In some embodiments, the vehicle control OBU is configured to perform a sensing method comprising Mesoscopic Level environment sensing and object detection. In some embodiments, the Mesoscopic Level environment sensing and object detection comprises improving the accuracy of detecting objects in the driving environment. In some embodiments, the vehicle control OBU is configured to perform a sensing method comprising Macroscopic information collection. In some embodiments, the Macroscopic information collection comprises collecting event information data comprising traffic status data and/or weather condition emergency data. In some embodiments, event information data are collected by TOC and CAVH. In some embodiments, event information data are transferred to OBU.

In some embodiments, the vehicle control OBU is configured to collect vehicle based data. In some embodiments, the vehicle control OBU is configured to collect standardized Basic Safety Message (BSM) data. In some embodiments, the vehicle control OBU is configured to collect SAE J2735 standardized Basic Safety Message (BSM) data. In some embodiments, the vehicle control OBU is configured to collect data describing vehicle size, position, speed, heading, acceleration, and brake system status. In some embodiments, the vehicle control OBU is configured to collect a variable set of data elements. In some embodiments, the vehicle control OBU is configured to collect vehicle occupant data. In some embodiments, the vehicle control OBU is configured to collect status information of vehicle occupants. In some embodiments, the vehicle control OBU is configured to localize a vehicle using High Definition Maps. In some embodiments, a vehicle comprises the OBU.

In some embodiments, the vehicle control OBU is configured to perform prediction methods. In some embodiments, the vehicle control OBU is configured to perform prediction methods at a microscopic, mesoscopic, and/or macroscopic level. In some embodiments, the vehicle control OBU is configured to perform prediction methods comprising predicting vehicle behaviors. In some embodiments, predicting vehicle behaviors comprises predicting car following, overtaking, and lane changing. In some embodiments, predicting vehicle behaviors is based on data collected by a vehicle comprising said OBU. In some embodiments, predicting vehicle behaviors comprises modifying a prediction according to environmental data collected and/or predicted by RSU. In some embodiments, the vehicle control OBU further comprises receiving road environment information from an RSU. In some embodiments, road environment information comprises road network traffic status, roadblocks, and/or weather information. In some embodiments, the prediction methods further comprise receiving vehicle behavior prediction data from an RSU. In some embodiments, the RSU predicts the behaviors of single vehicles, vehicles flow, and environmental information. In some embodiments, the RSU modifies prediction results according to off-line vehicle data, online speed data, engine revolution speed data, travelled distance, and/or information collected and predicted by an said OBU.

In some embodiments, the vehicle control OBU configured to perform decision-making methods. In some embodiments, the decision-making methods comprise choosing a route. In some embodiments, choosing a route comprises making route choice decisions at a microscopic, mesoscopic, and/or macroscopic scale. In some embodiments, the decision-making methods comprise deciding to follow a vehicle and/or change lanes. In some embodiments, the decision-making methods comprise receiving as input data collected by the vehicle comprising said OBU and data transmitted by RSU. In some embodiments, the decision-making methods comprise selecting a route or path. In some embodiments, the decision-making methods comprise optimizing a route. In some embodiments, the decision-making methods comprise receiving data transmitted by a RSU and adjusting said data in real time based on vehicle state information.

In some embodiments, the vehicle control OBU is configured to perform vehicle control methods. In some embodiments, the vehicle control OBU is configured to communicate with components providing sensing, prediction, and decision making. In some embodiments, the vehicle control OBU is configured to control a vehicle at a microscopic, mesoscopic, and/or macroscopic scale. In some embodiments, the vehicle control OBU is configured to perform vehicle control methods comprising controlling vehicle lane position, controlling vehicle speed, controlling vehicle direction, and/or controlling vehicle turning and elevation. In some embodiments, controlling vehicle lane position comprising maintaining lane position or changing lanes. In some embodiments, the vehicle control OBU is configured to receive instructions and/or data from an RSU. In some embodiments, the vehicle control methods comprising adjusting vehicle lane position, adjusting vehicle speed, adjusting vehicle direction, and/or adjusting vehicle turning and elevation using said instructions and/or data from said RSU. In some embodiments, the instructions and/or data from an RSU comprise information describing a system boundary, vehicle platoon, and/or work zone. In some embodiments, the instructions and/or data comprise control instructions for the OBU and the OBU controls a vehicle according to said control instructions. In some embodiments, the vehicle control OBU adjusts vehicle control according to signal priority.

In some embodiments, the vehicle control OBU comprises a plurality of modules. In some embodiments, the vehicle control OBU comprises a system on a chip, said system on a chip comprising a plurality of modules. In some embodiments, the vehicle control OBU comprises a general purpose processor. In some embodiments, the vehicle control OBU comprises a special purpose processor. In some embodiments, the general purpose processor is a central processing unit. In some embodiments, the special purpose processor is a graphics processing unit. In some embodiments, the vehicle control OBU comprises a memory module. In some embodiments, the vehicle control OBU comprises a computing subsystem configured to perform computation methods. In some embodiments, computation methods comprise processing sequential work for a general purpose processor. In some embodiments, computation methods comprise processing raw data, transporting data, and/or fusing data. In some embodiments, computation methods comprise performing a control algorithm, training a general model, and/or inferring from a general model. In some embodiments, computation methods comprise processing parallel work for a special purpose processor. In some embodiments, computation methods comprise training a tensor-centered model and/or inferring from a tensor-centered model.

In some embodiments, the vehicle control OBU comprises a data storage subsystem configured to perform data storage methods. In some embodiments, the data storage subsystem stores data for a computing subsystem of said OBU. In some embodiments, the data storage subsystem stores data comprising detected short-range environment information, HD map, and/or processed and aggregated environment information from RSU. In some embodiments, the data storage subsystem receives and/or retrieves data from on-board sensors, a RSU data processing module, and/or upper-level TCC/TCU. In some embodiments, data is stored using a long-term reliable storage hardware. In some embodiments, long-term reliable storage hardware comprises a magnetic and/or flash storage medium. In some embodiments, the data storage subsystem is configured to manage data, verify data, and provide efficient data storage and access.

In some embodiments, the vehicle control OBU comprises a cyber security subsystem configured to perform cyber security methods. In some embodiments, said cyber security subsystem is configured to provide critical OBU component-level protection, network-level protection, cloud-level protection, and/or application-level protection. In some embodiments, network-level protection guards against unauthorized intrusion and/or malicious insiders. In some embodiments, cloud-level protection provides security for data. In some embodiments, application-level protection comprises methods for fuzzing and penetration testing. In some embodiments, application-level protection is configured to minimize and/or eliminate attacks on confidentiality, attacks on integrity, and/or attacks an availability. In some embodiments, attacks on confidentiality comprise stealing or copying personal information. In some embodiments, attacks on integrity comprise sabotage. In some embodiments, attacks on integrity comprise corrupting, damaging, or destroying information and/or systems. In some embodiments, attacks on availability comprise preventing a target from accessing data. In some embodiments, attacks on availability comprise a ransomware and/or denial-of-service attack.

In some embodiments, the vehicle control OBU comprises a OBU Cloud subsystem configured to perform CAVH system functions. In some embodiments, the CAVH system functions comprise sensing, control, and/or prediction planning. In some embodiments, the vehicle control OBU comprises an OBU Cloud subsystem is configured to communicate with OBUs, users, vehicle, infrastructure, and/or CAVH system. In some embodiments, the OBU Cloud subsystem comprises an OBU-user end subsystem configured to store, share, manage, and integrate user profile data; provide pre-trip notification and customization; provide in-trip recommendations; and provide post-trip analysis. In some embodiments, the OBU Cloud subsystem comprises an OBU-vehicle end subsystem configured to store, share, manage, and integrate vehicle profile data and provide control of basic driving tasks. In some embodiments, the OBU Cloud subsystem comprises an OBU-vehicle end subsystem configured to provide navigation, guidance, and control through a vehicle-based cloud service. In some embodiments, the OBU Cloud subsystem comprises an OBU-infrastructure end subsystem configured to communicate with transportation infrastructure and IRIS subsystem and configure to provide data management, crowd-sensing, and coordinate control. In some embodiments, the OBU Cloud subsystem comprises an OBU-system end subsystem configured to communicate with CAVH system and perform analysis and optimization.

In some embodiments, the vehicle control OBU comprises a safety subsystem. In some embodiments, the safety subsystem comprises RSU based components and methods, Vehicle-based components and methods, and/or System based components and methods. In some embodiments, the RSU based components and methods are deployed on the roadside and controlled by RSUs. In some embodiments, the RSU based components comprise an active airbag. In some embodiments, the RSU based methods comprise producing a pavement condition warning and/or producing a pedestrian and/or bicyclist warning. In some embodiments, the vehicle-based components and methods are deployed on vehicles and controlled by vehicle OBUs. In some embodiments, the vehicle-based components are configured to brake a vehicle in an emergency and/or provide for a human driver to assume control of a vehicle. In some embodiments, the system based components and methods are configured to manage collaboration of multiple entities by TCC or TCU. In some embodiments, the system based components and methods are configured to manage incident responses and provide dynamic vehicle routing. In some embodiments, the vehicle control OBU comprises a safety subsystem configured to perform proactive, active, and passive safety measures. In some embodiments, proactive measures comprise preventive measures based on incident prediction and risk index estimation and are deployed prior to incident occurrence. In some embodiments, active measures comprise rapid incident detection and are deployed before harms to humans and/or property occur. In some embodiments, passive comprise post-incident measures to alleviate further harms and losses.

In some embodiments, the vehicle control OBU comprises a Human Machine Interface (HMI). In some embodiments, the HMI is configured to perform in a mode providing complete vehicle control by the IRIS; a mode providing vehicle control by cooperation between the vehicle and the IRIS; and a mode providing vehicle control by said vehicle. In some embodiments, the mode providing complete vehicle control by the IRIS receives human inputs and commands for vehicle motion control and controls said vehicle using said human inputs and commands for vehicle motion control in limited scenarios. In some embodiments, the human inputs and commands for vehicle motion control comprise instructions for a destination change or for driving to a site for medical treatment. In some embodiments, the mode providing vehicle control by cooperation between the vehicle and the IRIS receives human inputs and commands for vehicle motion control, receives IRIS inputs and commands for vehicle motion control, and resolves conflicts between human and IRIS inputs and commands. In some embodiments, IRIS inputs and commands for vehicle motion control receive preference over human inputs and commands for vehicle motion control when human and IRIS inputs and commands conflict. In some embodiments, the mode providing vehicle control by cooperation between the vehicle and the IRIS receives human inputs and commands for controlling entertainment systems, climate control, window raising and lowering, seat adjustment, and/or phone calls and messaging. In some embodiments, the mode providing vehicle control by said vehicle receives human inputs and commands for vehicle motion control that are not superseded by IRIS inputs and commands.

In some embodiments, the vehicle control OBU is configured to operate a vehicle on roads comprising a RSU network, comprising a partial RSU network, or roads not comprising a RSU network. In some embodiments, the vehicle control OBU is configured to receive complete information from IRIS for vehicle control. In some embodiments, the vehicle control OBU is configured to receive information from IRIS and integrate it with information from other sources for vehicle control. In some embodiments, the vehicle control OBU is configured to receive information from other vehicles and satellites for vehicle control.

In some embodiments, the vehicle control OBU is configured to perform methods for taxi dispatching and route optimization. In some embodiments, the vehicle control OBU is configured to communicate with a regional dispatching center. In some embodiments, the vehicle control OBU is configured to communicate with a regional dispatching center to receive information and commands for predicting high demand area, recommending a route, optimizing a route, and/or adjusting a route in real-time. In some embodiments, the methods for taxi dispatching and route optimization comprise predicting high demand area, recommending a route, optimizing a route, and/or adjusting a route in real-time. In some embodiments, the methods for taxi dispatching and route optimization comprise updating and optimizing a route based on real-time requirements of passengers.

In some embodiments, the vehicle control OBU is configured to perform methods for taxi safety. In some embodiments, methods for taxi safety comprise receiving and processing passenger requirements. In some embodiments, methods for taxi safety comprise identifying parking spots. In some embodiments, methods for taxi safety comprise making an emergency stop based on a passenger command. In some embodiments, methods for taxi safety comprise recording information comprising internal video and voice recording, external video and voice recording, and OBU sensor information. In some embodiments, methods for taxi safety comprise backing up recorded safety information on the CAVH cloud. In some embodiments, the vehicle control OBU is configured to perform methods for environmental protection. In some embodiments, the methods for environmental protection comprise managing taxi idling and taxi idling location. In some embodiments, the methods for environmental protection comprise receiving information from a regional dispatching center. In some embodiments, the information from a regional dispatching center comprises information describing real-time demand.

In some embodiments, the technology provides safety technologies as described herein and a vehicle operations and control system comprising one or more of a roadside unit (RSU) network; a Traffic Control Unit (TCU) and Traffic Control Center (TCC) network (e.g., TCU/TCC network); a vehicle comprising an onboard unit (OBU), e.g., as described herein; and/or a Traffic Operations Center (TOC).

In some embodiments, the technology provides a system (e.g., a vehicle operations and control system comprising a RSU network; a TCU/TCC network; a vehicle comprising an onboard unit OBU; a TOC; and a cloud-based platform configured to provide information and computing services; see, e.g., U.S. Provisional Patent Application Ser. No. 62/691,391, incorporated herein by reference in its entirety) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RSU network of embodiments of the systems provided herein comprises an RSU subsystem. In some embodiments, the RSU subsystem comprises:

a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, communication module communicates using wired or wireless media.

In some embodiments, sensing module comprises a radar based sensor. In some embodiments, sensing module comprises a vision based sensor. In some embodiments, sensing module comprises a radar based sensor and a vision based sensor and wherein said vision based sensor and said radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and wherein said sensing module comprises a satellite based navigation system and said inertial navigation system are configured to provide vehicle location data. In some embodiments, the satellite based navigation system is a Differential Global Positioning Systems (DGPS) or a BeiDou Navigation Satellite System (BDS) System or a GLONASS Global Navigation Satellite System. In some embodiments, the inertial navigation system comprises an inertial reference unit.

In some embodiments, the sensing module of embodiments of the systems described herein comprises a vehicle identification device. In some embodiments, the vehicle identification device comprises RFID, Bluetooth, Wi-fi (IEEE 802.11), or a cellular network radio, e.g., a 4G or 5G cellular network radio.

In some embodiments, the RSU sub-system is deployed at a fixed location near road infrastructure. In some embodiments, the RSU sub-system is deployed near a highway roadside, a highway on ramp, a highway off ramp, an interchange, a bridge, a tunnel, a toll station, or on a drone over a critical location. In some embodiments, the RSU sub-system is deployed on a mobile component. In some embodiments, the RSU sub-system is deployed on a vehicle drone over a critical location, on an unmanned aerial vehicle (UAV), at a site of traffic congestion, at a site of a traffic accident, at a site of highway construction, at a site of extreme weather. In some embodiments, a RSU sub-system is positioned according to road geometry, heavy vehicle size, heavy vehicle dynamics, heavy vehicle density, and/or heavy vehicle blind zones. In some embodiments, the RSU sub-system is installed on a gantry (e.g., an overhead assembly, e.g., on which highway signs or signals are mounted). In some embodiments, the RSU sub-system is installed using a single cantilever or dual cantilever support.

In some embodiments, the TCC network of embodiments of the systems described herein is configured to provide traffic operation optimization, data processing and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network is configured to provide real-time vehicle control and data processing. In some embodiments, the real-time vehicle control and data processing are automated based on preinstalled algorithms.

In some embodiments, the TCU network is a segment TCU or a point TCUs based on based on the geographical area covered by the TCU network. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes. In some embodiments, the system comprises a point TCU physically combined or integrated with an RSU. In some embodiments, the system comprises a segment TCU physically combined or integrated with a RSU.

In some embodiments, the TCC network of embodiments of the systems described herein comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the TCU network comprises: segment TCUs configured to process information from corridor and/or point TOCs and provide control targets to point TCUs; and point TCUs configured to process information from the segment TCU and RSUs and provide vehicle-based control instructions to an RSU. See, e.g., U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, each of which is incorporated herein in its entirety for all purposes.

In some embodiments, the RSU network of embodiments of the systems provided herein provides vehicles with customized traffic information and control instructions and receives information provided by vehicles.

In some embodiments, the TCC network of embodiments of the systems provided herein comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network of embodiments of the systems described herein comprises one or more TCUs comprising a sensor and control module configured to provide the sensing and control functions of an RSU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wife radio. In some embodiments, the TCU network comprises one or more TCUs comprising a transmission and network module configured to provide communication network function for data exchange between an automated heavy vehicles and a RSU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RSU. In some embodiments, the management and control methods of an RSU comprise local cooperative control of vehicles and roads, system monitoring, and emergency service. In some embodiments, the TCC network comprises one or more TCCs further comprising an application module and said service management module provides data analysis for the application module. In some embodiments, the TCU network comprises one or more TCUs further comprising an application module and said service management module provides data analysis for the application module.

In some embodiments, the TOC of embodiments of the systems described herein comprises interactive interfaces. In some embodiments, the interactive interfaces provide control of said TCC network and data exchange. In some embodiments, the interactive interfaces comprise information sharing interfaces and vehicle control interfaces. In some embodiments, the information sharing interfaces comprise: an interface that shares and obtains traffic data; an interface that shares and obtains traffic incidents; an interface that shares and obtains passenger demand patterns from shared mobility systems; an interface that dynamically adjusts prices according to instructions given by said vehicle operations and control system; and/or an interface that allows a special agency (e.g., a vehicle administrative office or police) to delete, change, and share information. In some embodiments, the vehicle control interfaces of embodiments of the interactive interfaces comprise: an interface that allows said vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other share mobility systems. In some embodiments, traffic incidents comprise extreme conditions, major accident, and/or a natural disaster. In some embodiments, an interface allows the vehicle operations and control system to assume control of vehicles upon occurrence of a traffic event, extreme weather, or pavement breakdown when alerted by said vehicle operations and control system and/or other share mobility systems. In some embodiments, an interface allows vehicles to form a platoon with other vehicles when they are driving in the same dedicated and/or same non-dedicated lane.

In some embodiments, the OBU of embodiments of systems described herein comprises a communication module configured to communicate with an RSU. In some embodiments, the OBU comprises a communication module configured to communicate with another OBU. In some embodiments, the OBU comprises a data collection module configured to collect data from external vehicle sensors and internal vehicle sensors; and to monitor vehicle status and driver status. In some embodiments, the OBU comprises a vehicle control module configured to execute control instructions for driving tasks. In some embodiments, the driving tasks comprise car following and/or lane changing. In some embodiments, the control instructions are received from an RSU. In some embodiments, the OBU is configured to control a vehicle using data received from an RSU. In some embodiments, the data received from said RSU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OBU is configured to send data to an RSU. In some embodiments, the data sent to said RSU comprises: driver input data; driver condition data; vehicle condition data; and/or goods condition data. In some embodiments, the driver input data comprises origin of the trip, destination of the trip, expected travel time, service requests, and/or level of hazardous material. In some embodiments, the driver condition data comprises driver behaviors, fatigue level, and/or driver distractions. In some embodiments, the vehicle condition data comprises vehicle ID, vehicle type, and/or data collected by a data collection module. In some embodiments, the goods condition data comprises material type, material weight, material height, and/or material size.

In some embodiments, the OBU of embodiments of systems described herein is configured to collecting data comprising: vehicle engine status; vehicle speed; goods status; surrounding objects detected by vehicles; and/or driver conditions. In some embodiments, the OBU is configured to assume control of a vehicle. In some embodiments, the OBU is configured to assume control of a vehicle when the automated driving system fails. In some embodiments, the OBU is configured to assume control of a vehicle when the vehicle condition and/or traffic condition prevents the automated driving system from driving said vehicle. In some embodiments, the vehicle condition and/or traffic condition is adverse weather conditions, a traffic incident, a system failure, and/or a communication failure.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

In some embodiments, the technology relates to the use of a connected automated vehicle highway system and methods and/or components thereof for heavy and special vehicles, e.g., as described in U.S. Provisional Patent Application Ser. No. 62/687,435, filed Jun. 20, 2018, which is incorporated herein by reference. In some embodiments, the technology comprises a cloud system as described in U.S. Provisional Patent Application Ser. No. 62/691,391, incorporated herein by reference in its entirety. In some embodiments, the technology comprises technologies related to safety systems as described in U.S. Provisional Patent Application Ser. No. 62/695,938, incorporated herein by reference in its entirety.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
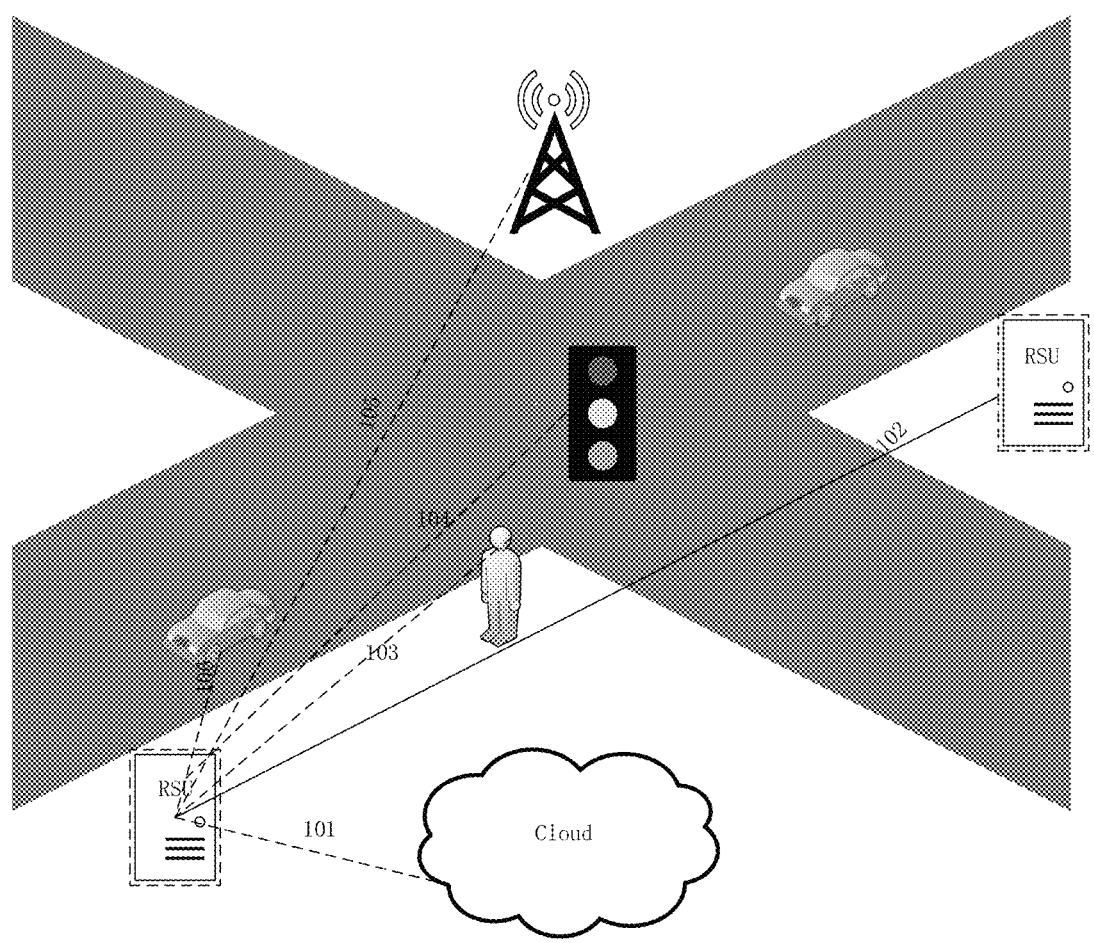
FIG. 1 is a schematic drawing showing embodiments of a communication environment, e.g., for infrastructure to communicate to other systems and/or components (I2X). Features of embodiments of the technology shown in FIG. 1 include, e.g., RSU communication with the cloud 101; RSU communication with other RSU 102; RSU communication with pedestrians 103; RSU communication with traffic signal 104; RSU communication with mobile network 105; and RSU communication with vehicles 106.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

In some embodiments, provided herein is technology related to a vehicle on-board unit (OBU) configured to provide transportation management and operations and vehicle control for connected and automated vehicles (CAV). In some embodiments, the OBU provides transportation management and operations and vehicle control for CAV in coordination with an intelligent road infrastructure system (IRIS). In some embodiments, the technology provides a system for controlling CAVs by sending customized, detailed, and time-sensitive control instructions and traffic information for automated vehicle driving to individual vehicles, such as vehicle following, lane changing, route guidance, and other related information (e.g., a CAVH system (e.g., as described in U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, the disclosures of which are herein incorporated by reference in their entireties). In some embodiments, the technology comprises a cloud system as described in U.S. Provisional Patent Application Ser. No. 62/691,391, incorporated herein by reference in its entirety.

In some embodiments, the technology comprises technologies related to safety systems as described in U.S. Provisional Patent Application Ser. No. 62/695,938, incorporated herein by reference in its entirety. In some embodiments, the technology relates to the use of a connected automated vehicle highway system and methods and/or components thereof for heavy and special vehicles, e.g., as described in U.S. Provisional Patent Application Ser. No. 62/687,435, filed Jun. 20, 2018, which is incorporated herein by reference.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensing-free" method does not comprise a sensing step, a "controller-free" system does not comprise a controller, etc.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

Description

In some embodiments, provided herein is a vehicle control on-board unit (OBU) that communicates with a vehicle infrastructure coordination transportation system. In some embodiments, the OBU described herein comprises sensing modules to sense and characterize the driving environment, components configured to enhance data processing and communication capabilities, a component to provide data backups, and/or a component to improve the automation level of the vehicle.

In some embodiments, e.g., as shown in FIG. 1, the technology comprises an I2X communication environment. In some embodiments, the I2X communication environment is associated with I2X communication systems, devices, and methods. In some embodiments, the I2X system comprises an RSU configured to communicate with the cloud, traffic signals, nearby pedestrians, the mobile network, and the vehicles on the road, e.g., using wireless communication (see, e.g., FIG. 1: 101, 103, 104, 105, 106). In some embodiments, the RSU communicates with other RSUs using land optical fiber or other wired communication method (FIG. 1, 102).

Figure 2:
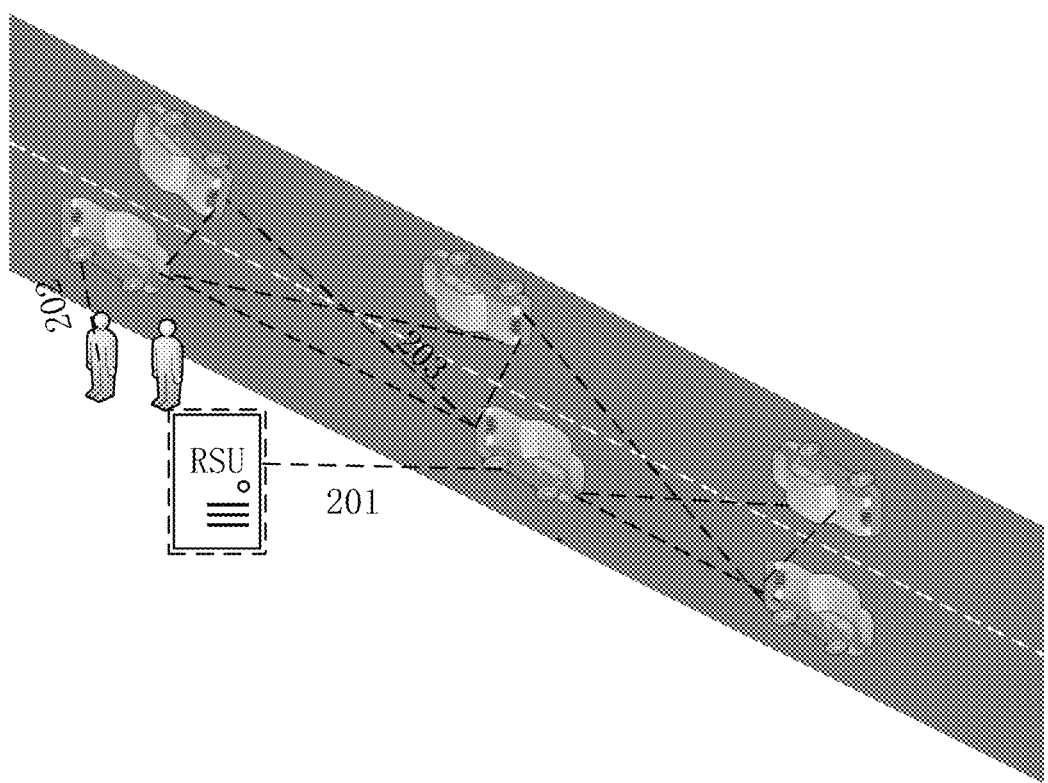
FIG. 2 is a schematic drawing showing embodiments of a vehicle to vehicle (V2V) communication environment. Features of embodiments of the technology shown in FIG. 2 include, e.g., vehicle to RSU communication 201; vehicle to pedestrian communication 202; and vehicle to vehicle communication 203.

In some embodiments, e.g., as shown in FIG. 2, the technology comprises a V2V communication environment. In some embodiments, the V2V communication environment is associated with V2V communication systems, devices, and methods. In some embodiments, a vehicle communicates with other nearby vehicles, e.g., through wireless communication (FIG. 2, 203). In some embodiments, a vehicle communicates with pedestrians (e.g., on sidewalk), e.g., using wireless communication (FIG. 2, 202). In some embodiments, a vehicle communicates with a nearby RSU, e.g., using wireless communication (FIG. 2, 203).

Figure 3:
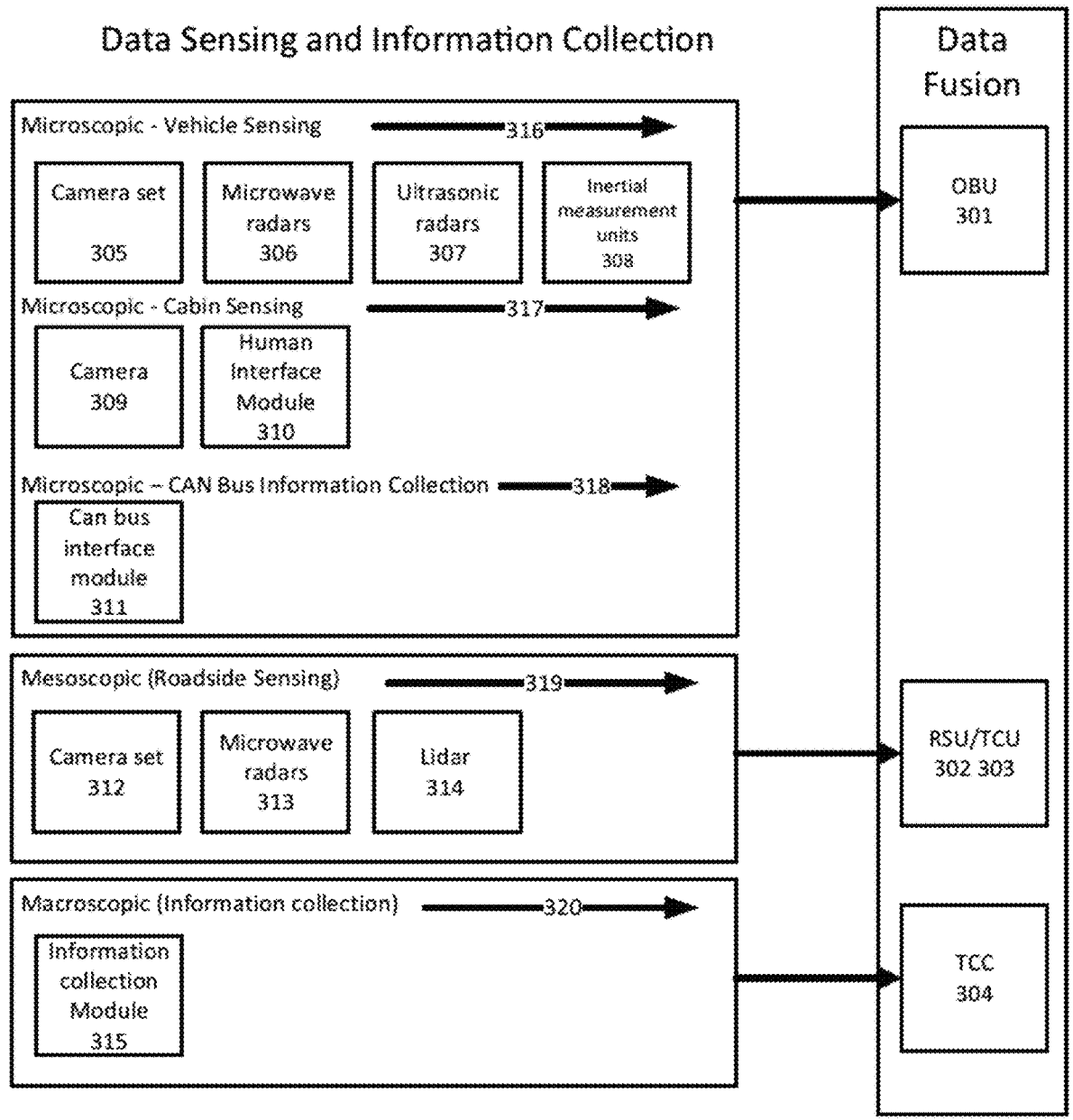
FIG. 3 is a schematic drawing showing embodiments of data sensing and collecting methods and systems. Features of embodiments of the technology shown in FIG. 3 include, e.g., OBU 301; RSU 302; TCU 303; TCC 304; Camera Set (vehicle exterior) 305; Microwave radars (vehicle exterior) 306; Ultrasonic radars (vehicle exterior) 307; Inertial measurement units 308; Cabin camera (vehicle interior) 309; Human interface module 310; CAN bus interface module 311; Camera Set (roadside) 312; Microwave radars (roadside) 313; Lidar (roadside) 314; Information collection module 315; Vehicle sensory data 316; Cabin passenger data 317; Basic safety message 318; Roadside sensory data 319; and Macroscopic traffic information 320.

In some embodiments, e.g., as shown in FIG. 3, the technology comprises data transmission between sensors and/or information collecting modules and data fusion units (e.g., OBU, RSU, TCU, and TCC). In some embodiments, e.g., at the microscopic level, vehicle sensory data, cabin passenger data, and basic safety message are collected. In some embodiments, data (e.g., vehicle sensory data, cabin passenger data, and basic safety message) are collected by sensors mounted on vehicle exterior, inside vehicle cabin, and from CAN bus interface. In some embodiments, microscopic level data are sent to OBU for data fusion. In some embodiments, e.g., at the mesoscopic level, roadside sensory data are collected, e.g., by sensors mounted on RSU. In some embodiments, mesoscopic level data are sent to RSU/TCU for data fusion. In some embodiments, e.g., at the macroscopic level, macroscopic traffic information is collected by information collecting module and sent to TCC for data fusion.

Figure 4:
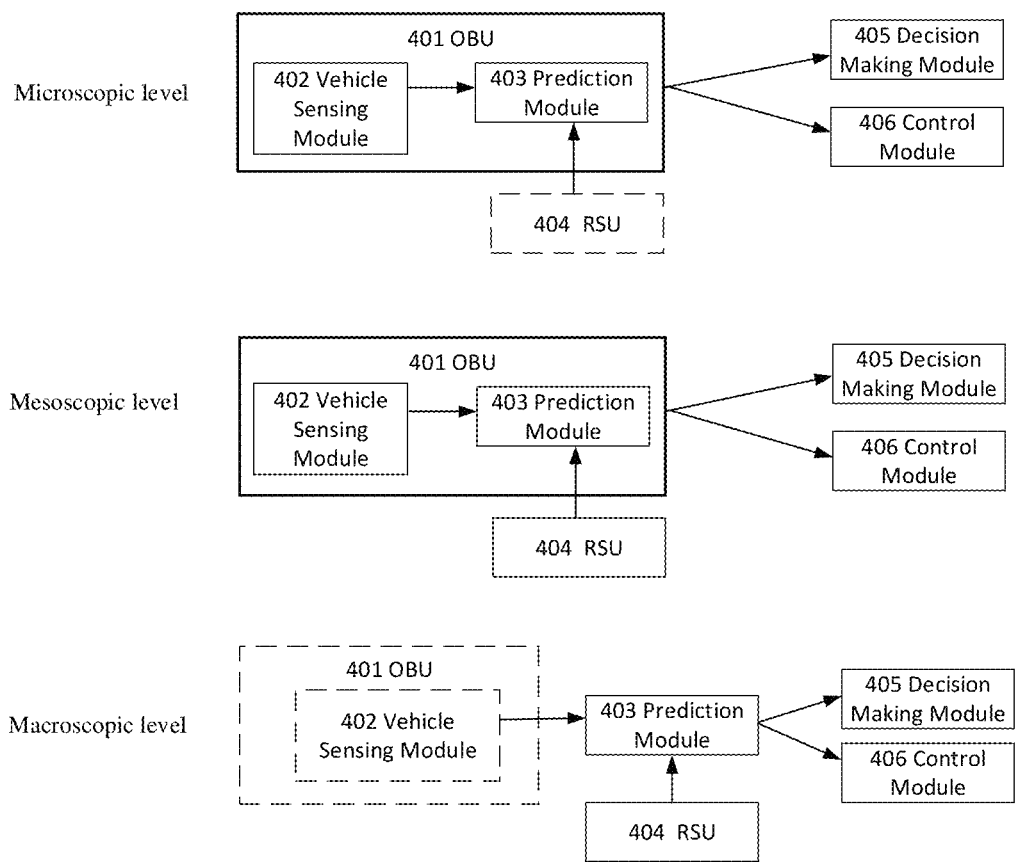
FIG. 4 is a schematic drawing showing embodiments of prediction methods and systems. Features of embodiments of the technology shown in FIG. 4 include, e.g., OBU 401; Vehicle sensing module 402; Prediction module 403; RSU 404; Decision making module 405; and Control module 406.

In some embodiments, e.g., as shown is FIG. 4, the technology provides a prediction module and associated methods and systems for prediction. In some embodiments, an OBU comprises a prediction module, e.g., in some embodiments prediction methods are provided by the OBU. In some embodiments, the OBU prediction module is configured to provide three levels of prediction methods and systems. In some embodiments, the prediction module predicts vehicle behaviors. In some embodiments, the prediction module predicts environmental information for the control module. In some embodiments, the prediction module predicts environmental information for the decision-making module. In some embodiments, predictions are based on historical and current information collected by the sensing module of OBU and/or RSU.

In some embodiments, e.g., at a microscopic level, an OBU predicts information based on data collected by the OBU. In some embodiments, the OBU is assisted by data transmitted from an RSU. In some embodiments, the OBU prediction module is configured to predict car following behaviors, e.g., accelerating, decelerating, maintaining current speed, emergency braking, overtaking, and/or lane changing. In some embodiments, predicted car following behaviors are predicted by an OBU and, in some embodiments, predicted car following behaviors are modified based on historical and/or predicted traffic condition information and/or weather information collected by an RSU.

In some embodiments, e.g., at a mesoscopic level, an OBU predicts information by integrating the data collected by the OBU and data transmitted from an RSU. In some embodiments, road environmental information (e.g., road network traffic status, roadblocks, and weather information) are predicted by the RSU. In some embodiments, following, overtaking, and/or changing lanes are predicted by the RSU and details of car following behaviors are predicted by OBU.

In some embodiments, e.g., at a macroscopic level, the OBU predicts information based on data received from the RSU and adjusts the prediction according to information collected by the OBU. In some embodiments, single vehicle behaviors, vehicle flow, and environmental information are predicted by the RSU. In some embodiments, data collected through the vehicle CANBU and real-time location information collected by a GPS device on the OBU are sent to the RSU as supplementary information.

Figure 5:
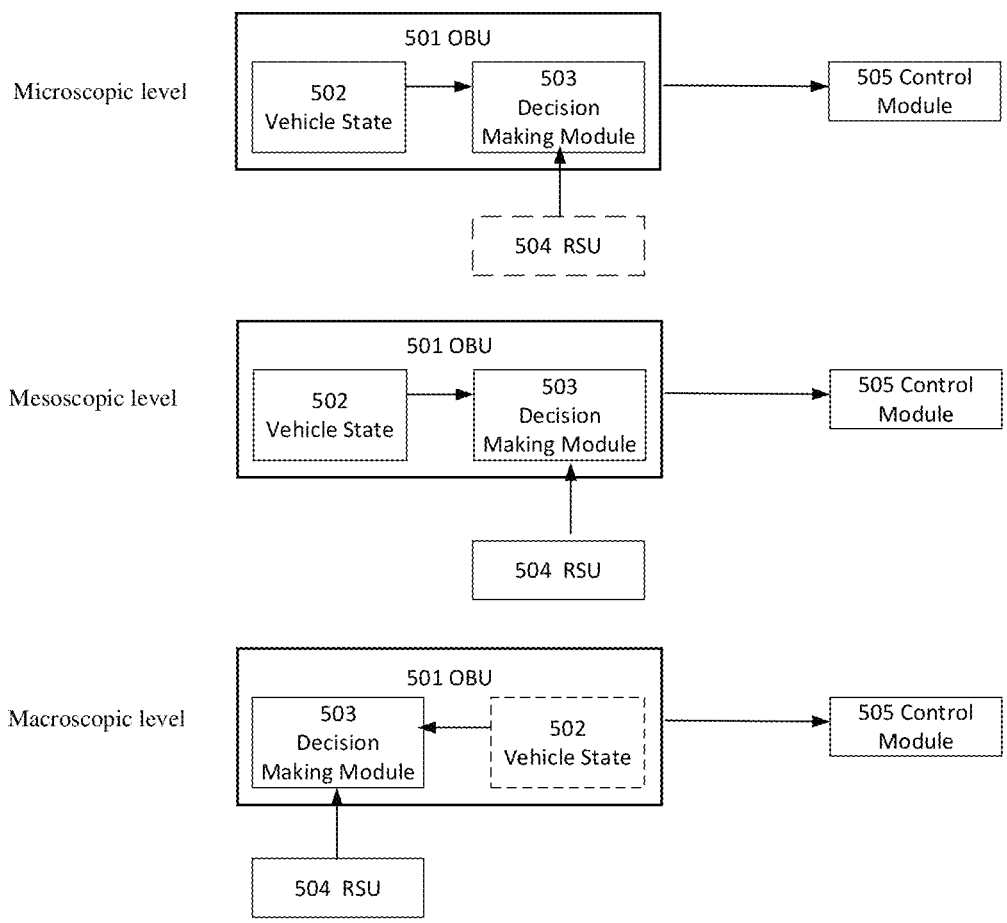
FIG. 5 is a schematic drawing showing embodiments of decision-making methods and systems. Features of embodiments of the technology shown in FIG. 5 include, e.g., OBU 501; Vehicle state 502; Decision making module 503; RSU 504; and Vehicle control module 505.

In some embodiments, e.g., as shown in FIG. 5, the technology provides a decision-making module and associated methods and systems for decision making. In some embodiments, a decision includes producing a driving plan, e.g., comprising instructions for controlling a vehicle. In some embodiments, an OBU provides decision-making methods three levels. In some embodiments, the decision-making module makes driving decisions for the control module, e.g., based on the information collected by the OBU and received from the RSU. In some embodiments, e.g., at a microscopic level, the OBU makes decisions based on the vehicle data collected by the OBU. In some embodiments, the OBU makes decisions based on the vehicle data collected by the OBU with assistance by the transmitted by the RSU. In some embodiments, at a mesoscopic level, the OBU makes decisions by integrating data collected by the vehicle (e.g., by a vehicle OBU) and data transmitted by the RSU. In some embodiments, e.g., at a macroscopic level, the OBU makes decisions based on data received from the RSU and adjusts the decision in real time based on vehicle state information.

Figure 6:
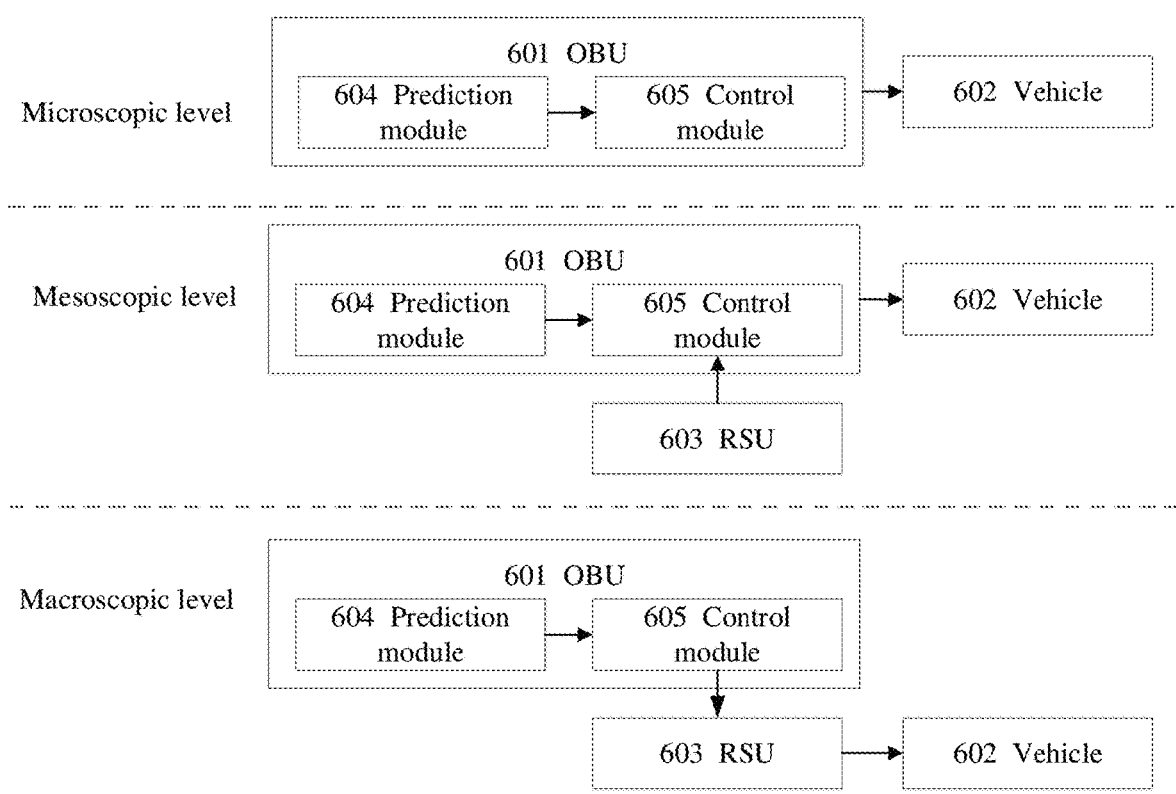
FIG. 6 is a schematic drawing showing embodiments of control methods and systems. Features of embodiments of the technology shown in FIG. 6 include, e.g., OBU 601; Vehicle 602; RSU 603; Decision making module 604; and Control module 605.

In some embodiments, e.g., as shown in FIG. 6, the technology provides a module configured to control a vehicle and associated methods and systems for control. In some embodiments, the technology provides a control module (e.g., of the OBU) configured to function at different levels. In some embodiments, the control module controls the vehicle, e.g., using information provided by the decision-making module. In some embodiments, e.g., at a microscopic level, a vehicle is controlled by the control module of OBU. In some embodiments, e.g., at a mesoscopic level, a vehicle is controlled by the control module of OBU receiving some instructions from RSU. In some embodiments, e.g., at a macroscopic level, a vehicle is controlled by RSU and the vehicle adjusts itself according to the instructions of OBU.

Figure 7:
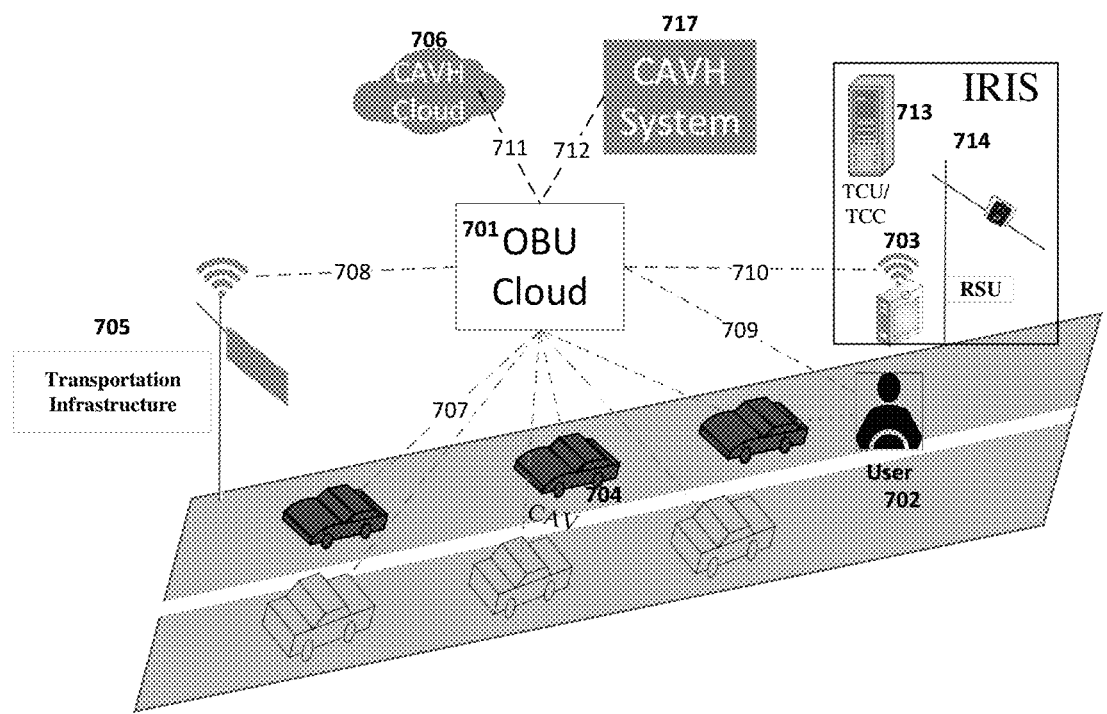
FIG. 7 is a schematic drawing showing embodiments of a cloud subsystem platform. Features of embodiments of the technology shown in FIG. 7 include, e.g., OBU Cloud 701; User 702; RSU 703; Vehicles 704, including connected automated vehicle (CAV) and non CAV; Transportation infrastructure 705; CAVH cloud 706; Communication between CAV and OBU cloud 707; Communication between transportation infrastructure and OBU cloud 708; Communication between user and OBU cloud 709; Communication between RSU and OBU cloud 710; Communication between CAVH Cloud and OBU cloud 711; Communication between CAVH System and OBU cloud 712; TCU/TCC 713; and IRIS 714.

In some embodiments, e.g., as shown in FIG. 7, the technology provides a cloud subsystem. In some embodiments, the technology comprises a cloud system as described in U.S. Provisional Patent Application Ser. No. 62/691,391, incorporated herein by reference in its entirety. In some embodiments, the technology provides an OBU Cloud platform residing in a CAVH system (see, e.g., the connected automated vehicle highway system and methods and/or components thereof as described in U.S. patent application Ser. No. 15/628,331, filed Jun. 20, 2017 and U.S. Provisional Patent Application Ser. Nos. 62/626,862, filed Feb. 6, 2018, 62/627,005, filed Feb. 6, 2018, 62/655,651, filed Apr. 10, 2018, and 62/669,215, filed May 9, 2018, the disclosures of which are herein incorporated by reference in their entireties). In some embodiments, OBU cloud services interact with CAVH users 702, vehicles 704 (e.g., including CAVH and non-CAVH vehicles), CAVH IRIS infrastructure 703, general transportation infrastructure 705, and CAVH Cloud 706. In some embodiments, e.g., for OBU cloud-user end 709, the OBU cloud stores users preferences and behavior, e.g., to provide inputs for executing pre-trip, within-trip and post-trip methods. In some embodiments, e.g., for OBU cloud-vehicle end 707, the OBU cloud stores vehicle profile information, e.g., to execute driving tasks, e.g., navigation, guidance, and control. In some embodiments, e.g., for OBU cloud-infrastructure end 710 and 708, the OBU cloud interacts with IRIS infrastructure and/or transportation infrastructure, e.g., to coordinate functions such as sensing, planning, prediction, control, and data management. In some embodiments, e.g., for OBU-cloud system end 711, the OBU cloud interacts with the CAVH system for global optimization and analysis. In some embodiments, e.g., for an area similar to TCU control range but that is not under CAVH control, the OBU cloud aggregates computation resources, sensors, and communications from CAVs in the area to provide crowd-sensing, coordinated control, fleet/vehicle management, and operational optimization for each CAVs to increase safety, efficiency, and mobility.

Figure 8:
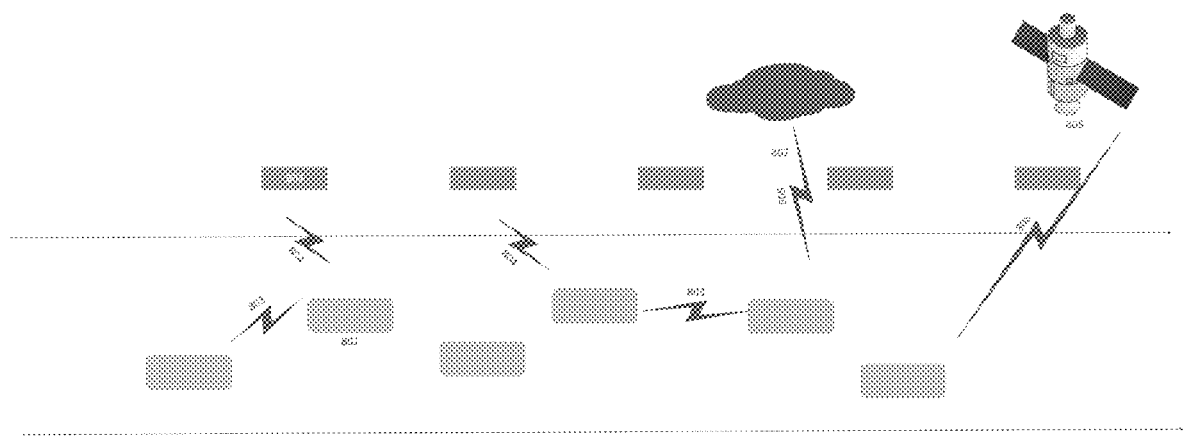
FIG. 8 is a schematic drawing showing embodiments of vehicle control purpose information. Features of embodiments of the technology shown in FIG. 8 include, e.g., vehicle 801; RSU 802; Information exchange between vehicle and vehicle 803; Information exchange between infrastructure and vehicle 804; Information exchange between cloud and vehicle 805; Information exchange between satellite and vehicle 806; Cloud 807; and Satellite 808.

In some embodiments, e.g., as shown in FIG. 8, the technology provides systems and methods for vehicle control. In some embodiments, e.g., for roads comprising an RSU network, an OBU on a vehicle receives traffic information (e.g., complete, effectively, and/or substantially complete traffic information), e.g., comprising information about the vehicle environment and roads, from RSU, e.g., using I2V communication. In some embodiments, the information is provided as inputs for vehicle control. In some embodiments, other information, e.g., information form V2V communication, supplements the information provided by the RSU to the OBU. In some embodiments, e.g., for roads comprising a partial RSU network, an OBU on a vehicle receives partial traffic information, e.g., comprising information about the vehicle environment and roads, from RSU, e.g., using I2V communication. In some embodiments, other data sources, such as information provided by exchange between cloud and vehicle, and information provided by exchange between two vehicles, is provided for control of a vehicle. In some embodiments, e.g., for roads that do not comprise an RSU or RSU network (e.g., roads that are not effectively served by an RSU or RSU network), information from other vehicles and satellites provide information for vehicle control.

Figure 9:
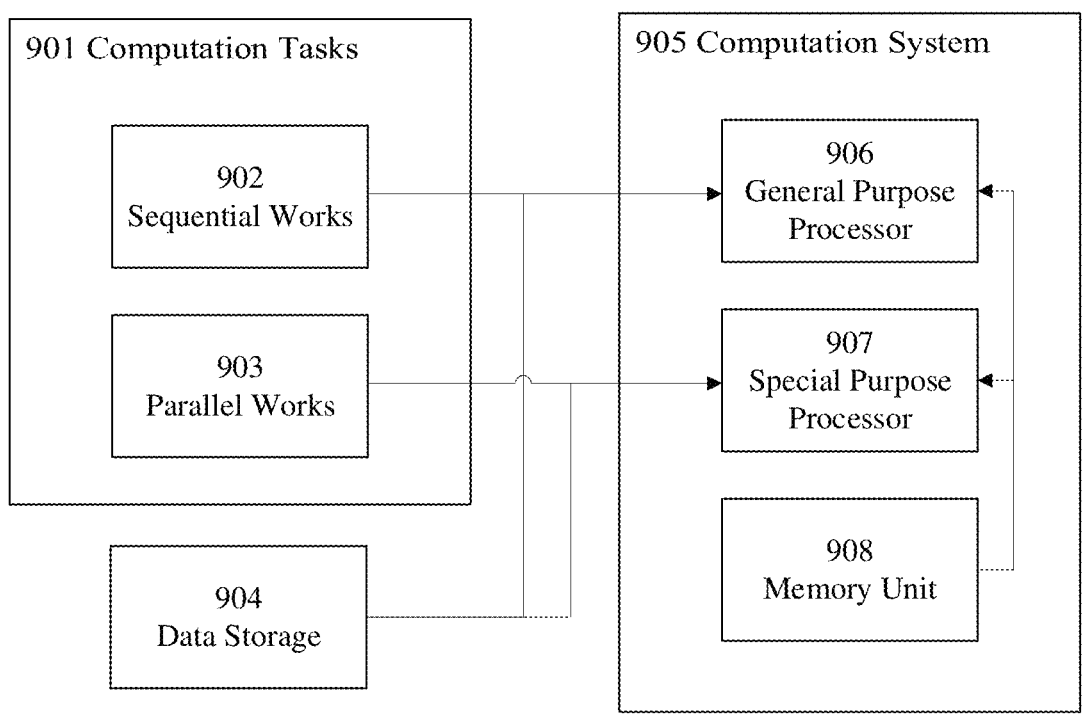
FIG. 9 is a schematic drawing showing embodiments of a computation module design, methods, and systems. Features of embodiments of the technology shown in FIG. 9 include, e.g., Computation tasks 901, e.g., computation involved tasks from CAVH system; Sequential works 902, e.g., one type of computation task; Parallel works 903, e.g., one type of computation task; Data storage 904 and data-related support system; Computation system 905, e.g., hardware/software system for computation; General purpose processor 906, e.g., specialty hardware on sequential works; Special purpose processor 907, e.g., specialty hardware on parallel works; and a Memory unit 908, e.g., providing memory support for computation.

In some embodiments, e.g., as shown in FIG. 9, the technology provides a computation module and associated systems and methods. In some embodiments, the computation module is configured to perform computation tasks. In some embodiments, computation tasks comprise sequential works. In some embodiments, computation tasks comprise parallel works. In some embodiments, sequential works and parallel works are identified and/or divided based on their properties. In some embodiments, computation tasks are provided as inputs to a general purpose processor and/or a special purpose processor, e.g., in a computation system, respectively. In some embodiments, sequential works are provided as inputs to a general purpose processor. In some embodiments, parallel works are provided as inputs to a special purpose processor. In some embodiments, a data storage system and/or memory unit provide support for computation process during computation.

Figure 10:
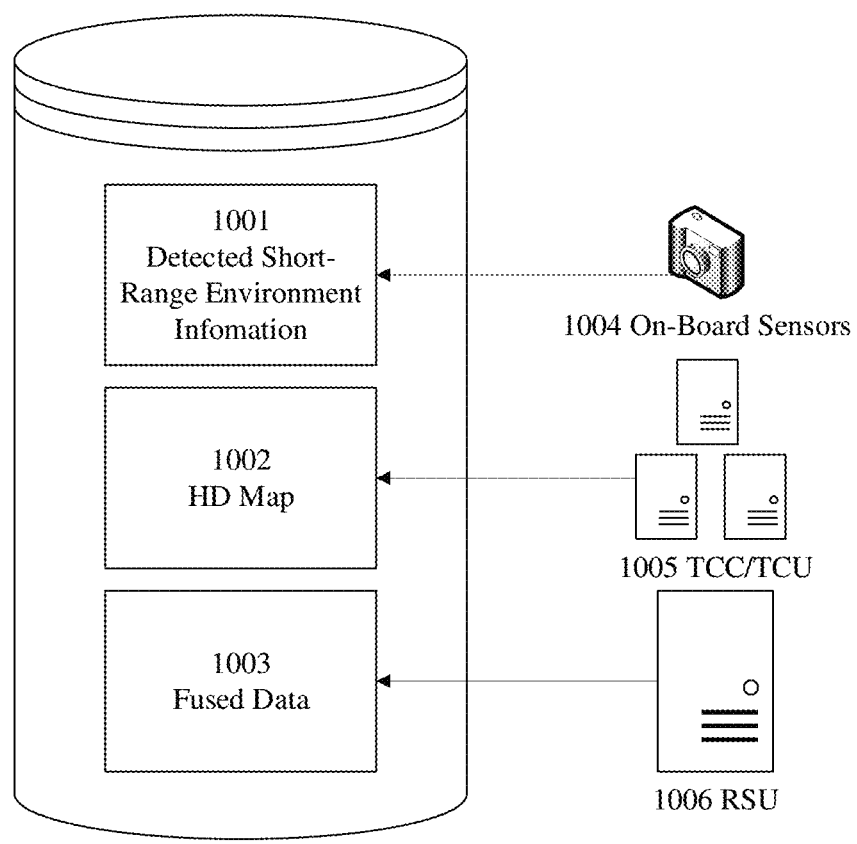
FIG. 10 is a schematic drawing showing embodiments of a data flow and data storage subsystem. Features of embodiments of the technology shown in FIG. 10 include, e.g., Detected short-range environment information 1001; high-definition (HD) map 1002, e.g., having a high precision (e.g., at centimeter resolution); Fused data 1003, e.g., aggregated data integrated from multiple data sources to produce consistent, accurate, and useful information; On-board sensors 1004, e.g., sensors on vehicle; TCC/TCU 1005; and RSU 1006.

In some embodiments, e.g., as shown in FIG. 10, the technology provides a data storage subsystem. In some embodiments, the technology comprises a data flow, e.g., data flow to and from the data storage subsystem. In some embodiments, a data storage subsystem hosts data, e.g., fro a source or from from multiple sources. In some embodiments, a source comprises short-range environment information detected and/or provided by on-board sensors, a high-definition (HD) map (e.g., from TCC/TCU), and fused data (e.g., from RSU).

Figure 11:
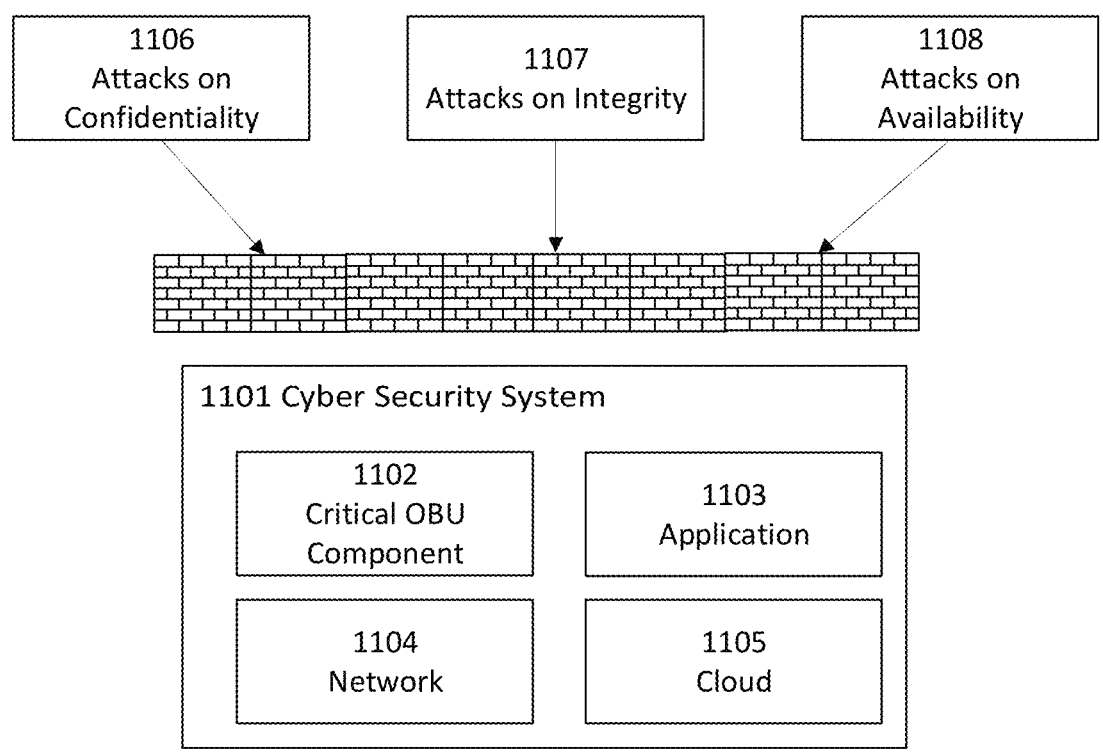
FIG. 11 is a schematic drawing showing the design and architecture of embodiments of a cyber security system. Features of embodiments of the technology shown in FIG. 11 include, e.g., Cyber security system 1101; Critical OBU component 1102; Application 1103, e.g., application inside OBU system; Network 1104, e.g., network between entities; Cloud 1105, e.g., cloud system for OBU system; Attacks on confidentiality 1106, e.g., stealing or copying a target's personal information; Attacks on integrity 1107, e.g., integrity attacks attempting to corrupt, damage, or destroy information or systems, and people who rely on information or systems (e.g., sabotage). Attacks on availability 1108, e.g., preventing a target from accessing data (e.g., ransomware, denial-of-service attacks, etc.)

In some embodiments, e.g., as shown in FIG. 11, the technology provides a cyber security system. In some embodiments, the cyber security system comprises a design and an architecture. In some embodiments, the cyber security system provides cyber protections across multiple levels, e.g., critical OBU component level, application level, network level, and cloud level. In some embodiments, the cyber security system prevents several types of attacks, i.e. attacks on confidentiality, attacks on integrity, and attacks on availability.

Figure 12:
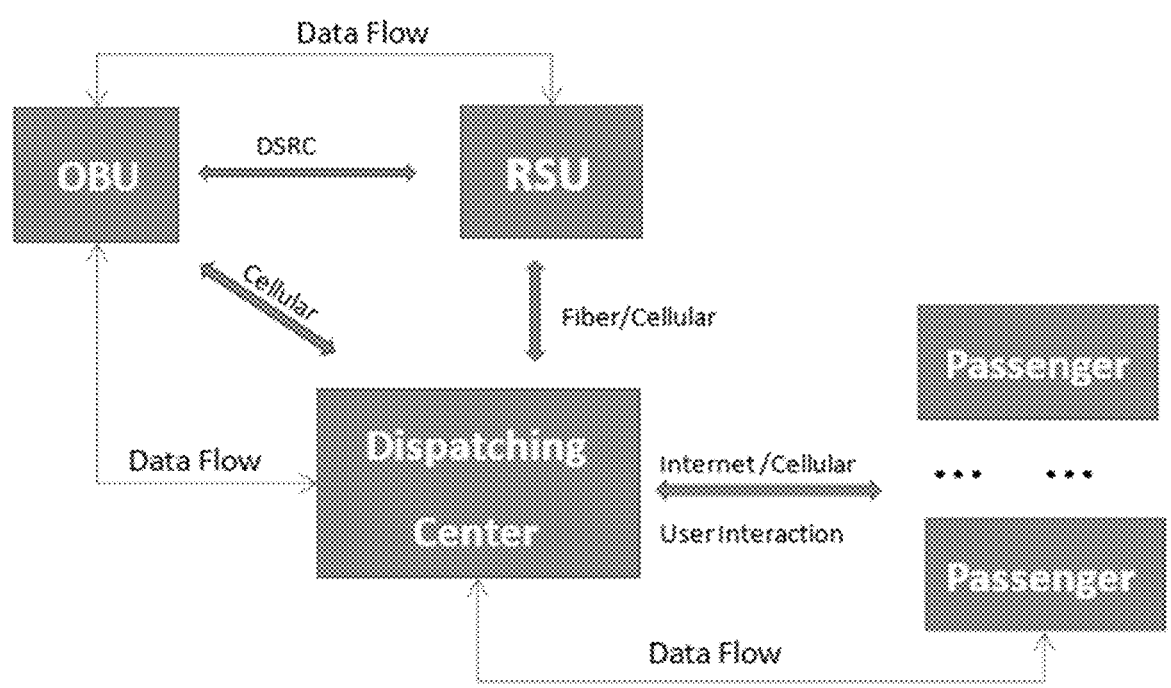
FIG. 12 is a schematic drawing showing embodiments of information flow for shared driverless vehicle-related applications.

In some embodiments, e.g., as shown in FIG. 12, the technology comprises a module configured to manage information flow for shared driverless vehicles. In some embodiments, the technology provides a module to choose a route based on data and/or information related to a microscale, mesoscale, and/or macroscale user requirement and/or information provided by a microscale, mesoscale, and/or macroscale CAVH system requirement. In some embodiments, the module manages a vehicle having a passenger. In some embodiments, the module manages user interactions between a vehicle and passengers. In some embodiments, the module comprises methods and systems for selecting passengers and optimizing (e.g., coordinating) selection of routes and passengers along a route. In some embodiments, the module comprises methods and systems for selecting a route and optimizing (e.g., coordinating) selection of passengers and routes comprising passengers. In some embodiments, the module manages a vehicle that does not have a passenger (e.g., a passenger-free vehcile). In some embodiments, the module provides systems and methods for optimizing the activity of idle vehicles. In some embodiments, the module provides methods and systems for finding a parking space (e.g., nearest parking space (e.g., free parking space)). In some embodiments, the module configured to manage information flow for shared driverless vehicles comprises methods and systems to predict and/or direct one or more vehicles to a high demand area. In some embodiments, the module comprises methods and systems for optimizing route choice to pick up passengers. In some embodiments, the module provides methods and systems for operational control adjustment with and without passenger input. In some embodiments, the module provides prediction methods and systems for choosing a lane and/or providing instructions to a car to enter a chosen lane. In some embodiments, the module comprises algorithms, data, profiles, and information; and systems and methods for mimicking human driver behavior. In some embodiments, the module is configured to support passenger and driverless car interaction and communication. In some embodiments, the module is configured to provide customized service for passenger, e.g., to support and/or manage user interaction between vehicle and passengers and/or to provide real-time route optimization base on the requirement of passenger.

Figure 13:
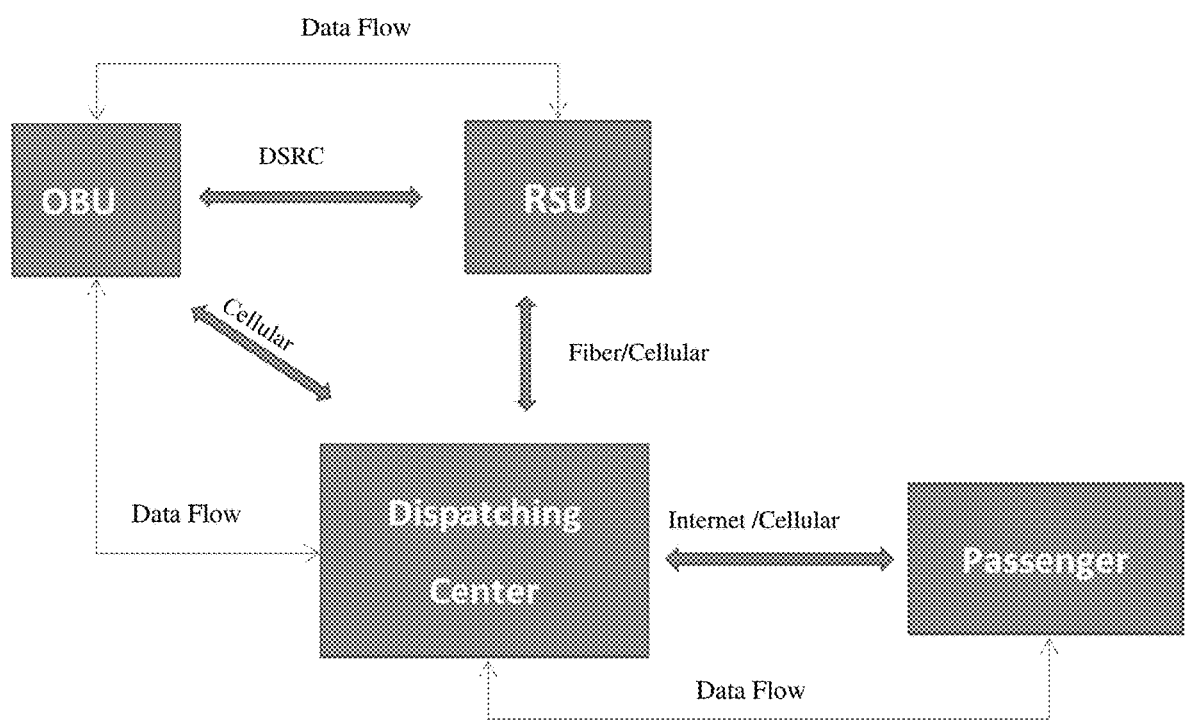
FIG. 13 is a schematic drawing showing embodiments of information flow for taxi-related applications.

In some embodiments, e.g., as shown in FIG. 13, the technology provides a module optimized to perform optimization methods and systems to optimize routes and/or picking up and dropping off passengers, e.g., for taxis and other hired vehicles (e.g, car services, shuttles, etc.) In some embodiments, an OBU support real-time communication between taxis and a regional dispatching center. In some embodiments, the module produces a command message. In some embodiments, the command message is relayed to a dispatching center and/or issued by a dispatching center. In some embodiments, the command message provides instructions relating to optimization methods, e.g., predicting high demand areas, optimizing regional routes, recommending routes, and adjusting routes in real time (e.g., real-time re-routing). In some embodiments, the OBU updates and optimizes a route based on real-time requirements of passengers. In some embodiments, the module provides methods and systems for safety. For example, in some embodiments, the module provides sensing and/or computing methods and systems for safety. In some embodiments, an OBU accepts, processes, and understands a passenger requirement. In some embodiments, OBU provide real-time safety support and management for taxis and other vehicles that frequently park. In some embodiments, the module provides systems and methods configured to perform a stop, e.g., in some embodiments the module sends instructions to a vehicle to stop the vehicle. In some embodiments, the instructions comprise steps to instruct a vehicle to make an emergency stop. In some embodiments, a stop is based on a passenger command. In some embodiments, the safety module provides a recording function, e.g., to record the output of one or more sensors characterizing the velocity, acceleration, location, etc. of a vehicle. In some embodiments, the safety module provides systems and modules for information backup. In some embodiments, the safety module provides a "black box" function similar to a black box for an airplane as known in the art. In some embodiments, the safety module provides systems and methods for recording video and/or audio inside a vehicle, recording video and/or audio outside a vehicle, and for backing up the recorded information in inside video in the CAVH cloud.

Figure 14:
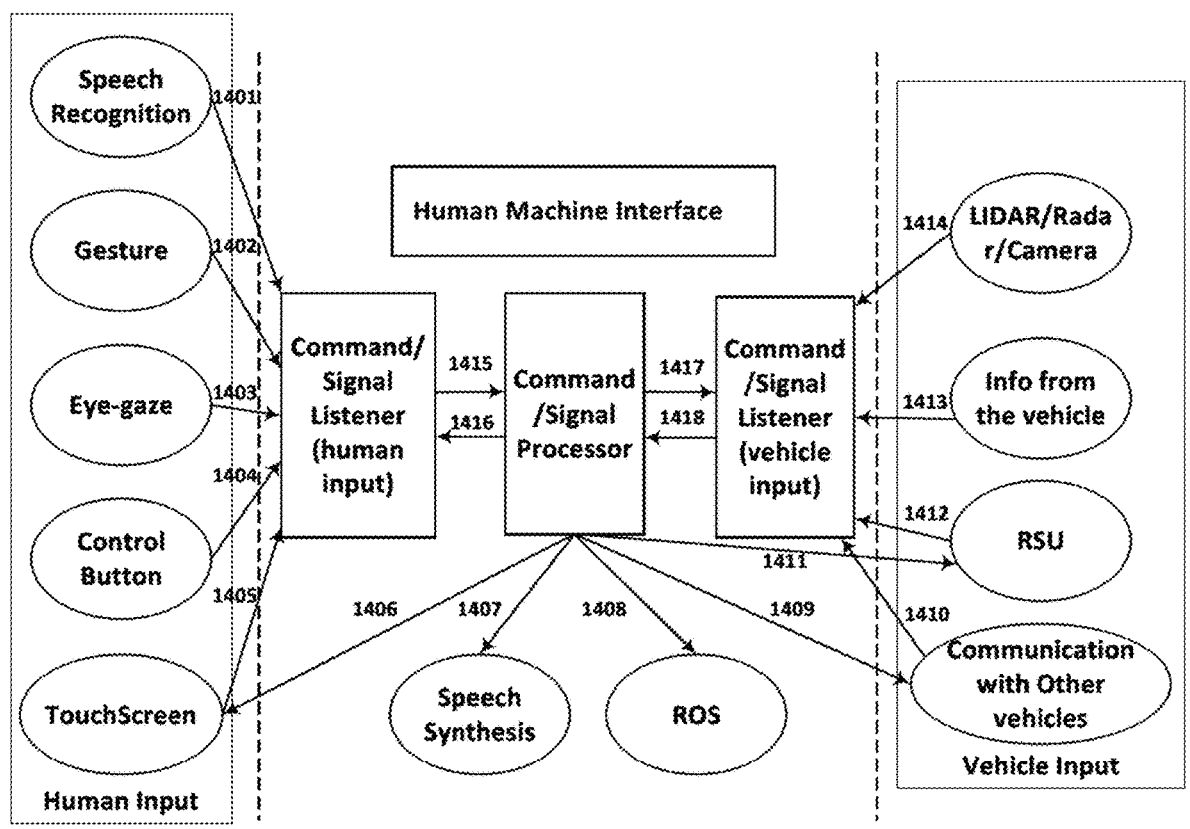
FIG. 14 is a schematic drawing showing embodiments of a human-machine interface. Features of embodiments of the technology shown in FIG. 14 include, e.g., Voice command recognition 1401 (e.g., destination, start, stop, accelerate, decelerate, lane change); Gesture recognition 1402 (e.g., a gesture (e.g., pointing and the position of the finger) is recognized and output as a direction)); Eye-gaze recognition 1403 (e.g., eye direction is recognized and a direction is output based on the recognized gaze direction and/or face orientation); Control button 1404, e.g., used as a backup of key controlling operation; Touch screen 1405 and 1406, e.g., for input (e.g., text input and command input by touching) and output (e.g., showing a warning message, explanation message and/or other information (e.g., velocity, location, map, and other output); Speech synthesis 1407 (e.g., to render an output message in voice (e.g., when a driver is not able to look at the screen); Output command 1408 to control a vehicle is sent to ROS and ROS sends the command to a corresponding ECU via CAN bus; Message broadcast to another vehicle 1409 and 1410 (e.g., a message is sent and the message received from another vehicle is sent to the Command/Signal Listener (vehicle side); RSU 1411 & 1412 (e.g., sends a command as input from a vehicle and a vehicle sends information (e.g., location, velocity) to RSU; Control signal 1413 from vehicle is shown to human. (e.g., low fuel, engine condition, engine temperature); Data from sensing devices 1414 are input; Input from and output for human 1415 and 1416; Input from and output for vehicle 1147 and 1418.

In some embodiments, e.g., as shown in FIG. 14, the technology provides a human-machine interface and related systems and methods. In some embodiments, the human-machine interface comprises a Command/Signal Processor. In some embodiments, the Command/Signal Processor is configured to receive and/or process input from a human and/or a vehicle. In some embodiments, the Command/Signal Processor is configured to send an output command and/or a message to one or more other modules or components, e.g., including ROS, speech synthesis, touch screen, RSU, and Communication with other vehicles. In some embodiments, inputs are from a human, e.g., speaking, gestures, eye-gaze, and touch screen or control buttons. In some embodiments, the inputs are from a vehicle, e.g., LIDAR/Radar/Camera, Info from the vehicle, RSU, and Communication with Other vehicles.

We claim:

1. A vehicle on-board unit (OBU) comprising:
   a data collection and storage component configured to receive vehicle motion state parameters and vehicle environment parameters;
   a communications module capable of transmitting information and receiving information from a roadside unit (RSU) comprising a sensing module,
   wherein said RSU fuses data from individual vehicles, the sensing module, and a cloud system to produce fused data; predicts longitudinal and lateral movement behavior for individual vehicles at a microscopic level based on the fused data to produce prediction information comprising predicted single vehicle behavior information, predicted vehicle flow information, and predicted environmental information; provides planning and decision making functions; and provides vehicle-specific control instructions comprising a longitudinal acceleration rate, a lateral acceleration rate, and a vehicle orientation; and wherein the communications module receives the fused data, the prediction information, and the vehicle-specific control instructions from the RSU;

wherein said RSU modifies prediction results according to off-line vehicle data, online speed data, engine revolution speed data, travelled distance, and information collected and predicted by said OBU;

wherein said RSU provides high-resolution maps comprising lane width, lane approach, grade, and road geometry information to said OBU;

a location component comprising a high-resolution map and a global positioning system device;

a data fusion unit configured to fuse the data from the vehicle, the RSU, and the cloud system;

a prediction module configured to predict behavior of individual vehicles at a microscopic level based on the fused data; and a vehicle controller configured to execute said vehicle-specific control instructions for driving tasks, wherein said vehicle-specific control instructions comprise control instructions for vehicle longitudinal acceleration and speed, lateral acceleration and speed, and vehicle orientation and direction; and wherein said OBU is configured to perform said vehicle-specific control functions by the vehicle controller controlling vehicle longitudinal acceleration and speed, lateral acceleration and speed, and vehicle orientation and direction according to said vehicle control instructions.

2. The OBU of claim 1 configured to communicate in real-time with components of a connected and automated vehicle highway (CAVH) system using wireless media or with other vehicles using wireless media.

3. The OBU of claim 1 configured to communicate with a CAVH cloud.

4. The OBU of claim 1 configured to:
receive data and said prediction information from a roadside unit (RSU), wherein said data and said prediction information are used to control a connected and automated vehicle (CAV);
receive data from an RSU; and use said data, said vehicle motion state parameters, and said vehicle environment parameters to control a CAV; or request data from an RSU; and use said data, said vehicle motion state parameters, and said vehicle environment parameters to control a CAV.

5. The OBU of claim 1 wherein said communications module is configured to communicate with an RSU, a CAVH system, people, or other vehicles.

6. The OBU of claim 1 wherein said data collection and storage component is configured to receive data from external vehicle sensors, RSU sensors, or in-vehicle sensors.

7. The OBU of claim 1 configured to perform a method comprising:
detecting objects in the driving environment;
receiving supplemental driving environment data from a CAVH system;
receiving traffic status information, weather information, or special event information from a CAVH system;
receiving basic safety message (BSM) data;
receiving vehicle occupant data describing vehicle occupant status; or receiving a high definition map and, optionally, vehicle position information.

8. The OBU of claim 1 configured to perform a method comprising:
predicting vehicle behavior using said vehicle motion state parameters, said vehicle environment parameters, and data received from an RSU;
receiving predicted environmental status from an RSU; or receiving predicted vehicle behavior or predicted traffic flow from an RSU.

9. The OBU of claim 1 configured to perform a method comprising:
making vehicle control decisions using said vehicle motion state parameters, said vehicle environment parameters, and data received from an RSU;
making path and route decisions using said vehicle motion state parameters, said vehicle environment parameters, and data received from an RSU; or
making route optimization decisions using data received from an RSU and, optionally, modifying route optimization decisions using said vehicle motion state parameters and said vehicle environment parameters.

10. The OBU of claim 1 configured to perform a method comprising:
controlling a vehicle by controlling vehicle longitudinal acceleration and speed, lateral acceleration and speed, and vehicle orientation and direction;
receiving information from an RSU to assist vehicle control; or
receiving control instructions from an RSU.

11. The OBU of claim 1 wherein said components are separate modules or are integrated into a system on a chip.

12. The OBU of claim 1 further comprising a central processing unit (CPU), a graphics processing unit (GPU), a memory unit, a power supply, a CAN bus, or a human machine interface.

13. The OBU of claim 1, wherein said data collection and storage component is configured to store said vehicle motion state parameters and said vehicle environment parameters; a high definition map; or processed and aggregated environment information received from an RSU.

14. The OBU of claim 1, wherein said data collection and storage component is configured to store data from external vehicle sensors, RSU sensors, in-vehicle sensors, a traffic control center (TCC), or a traffic control unit (TCU) in long-term reliable storage and to update said data periodically.

15. The OBU of claim 1, wherein said OBU is configured to be supported by a cyber security subsystem.

16. The OBU of claim 1, wherein said OBU is configured to be supported by a safety subsystem.

17. The OBU of claim 1, wherein said OBU is configured to
receive complete vehicle control instructions from a CAVH system;
receive partial vehicle control instructions from a CAVH system and partial vehicle control instructions from a driver; or
receive complete vehicle control instructions from a driver,
wherein said complete or partial vehicle control instructions comprise instructions for vehicle longitudinal acceleration and speed, lateral acceleration and speed, and vehicle orientation and direction.

18. The OBU of claim 1, wherein said OBU is configured to:
- receive information or vehicle control instructions from RSUs providing complete coverage of CAVH roads;
- receive information from RSUs providing partial coverage of CAVH roads and receive vehicle control instructions from other sources; or
- receive information from non-RSU sources for vehicle control.

19. The OBU of claim 1 configured to provide vehicle-to-vehicle or vehicle-to-infrastructure communication using a wireless communication technology.

20. The OBU of claim 1 wherein one or more of said components is provided as a hardware component or one or more of said components is provided as a software component.

21. A method of controlling a vehicle comprising providing a CAVH system and an OBU of claim 1 to a vehicle.

* * * * *